United States Patent [19]

Nichols

[11] Patent Number: 5,535,620
[45] Date of Patent: Jul. 16, 1996

[54] ENGINE MANAGEMENT SYSTEM

[75] Inventor: Angelo H. Nichols, Grosse Pointe Woods, Mich.

[73] Assignee: Applied Computer Engineering, Inc., Warren, Mich.

[21] Appl. No.: 402,951

[22] Filed: Mar. 13, 1995

Related U.S. Application Data

[63] Continuation-in-part of Ser. No. 43,034, Apr. 5, 1993, Pat. No. 5,396,794.

[51] Int. Cl.[6] .................................................. G01M 15/00
[52] U.S. Cl. ...................................... 73/118.1; 364/424.03
[58] Field of Search ............................... 73/118.1, 865.6; 60/277; 364/431.03–431.05, 424.03

[56] References Cited

U.S. PATENT DOCUMENTS

| | | | |
|---|---|---|---|
| 4,587,938 | 5/1986 | Kobayashi et al. | 123/416 |
| 5,119,629 | 6/1992 | Kume et al. | 60/274 |
| 5,150,685 | 9/1992 | Porter et al. | 123/478 |
| 5,214,582 | 5/1993 | Gray | 364/431.11 |
| 5,233,964 | 8/1993 | Jamoua et al. | 123/479 |
| 5,261,366 | 11/1993 | Reguero | 123/299 |
| 5,267,542 | 12/1993 | Keskula | 123/417 |

*Primary Examiner*—Robert Raevis
*Attorney, Agent, or Firm*—Michael J. Weins

[57] ABSTRACT

The present invention provides a system for testing an engine designed to be run under the control of an engine control module. The system modifies the operation of the engine while maintaining the engine control module active so as to allow control of the engine to be transferred between the engine management system and the engine control module. The present invention allows an operator to alter the operation of the engine by varying the signals to the engine's injectors and ignition systems. While the engine is operating under user defined injector signals, a simulated exhaust gas signal is provided to the engine control module. This simulated exhaust gas signal allows the engine to be tested under operating conditions where the exhaust gas generated would cause correction by the engine control module making the test condition sought unsustainable. The system can be programmed to periodically return all functions to the engine control module allowing the establishment of new operating parameters for the engine. In a preferred embodiment, the engine management system can also take control of the engine's electronic ignition system allowing the user to alter spark timing and ignition dwell time. In addition to providing integrated injector and ignition control, the engine management system of the present invention allows the user to take engine control from and return engine control to the engine control module without knowing the details of the algorithms used to run the engine control module.

16 Claims, 11 Drawing Sheets

ENGINE MANAGEMENT SYSTEM

This application is a continuation in part of Ser. No. 043,034 filed Apr. 5, 1993 (now U.S. Pat. No. 5,396,794).

FIELD OF INVENTION

The present invention relates to an engine test system and more particularly to a system and method for independently regulating the electronic fuel injection system and/or ignition system of a combustion engine which normally operates under an engine control module of the engine.

BACKGROUND OF THE INVENTION

Current engines have electronic fuel injection systems and frequently electronic ignition systems which are controlled by an engine control module. The engine control module also monitors data generated for many aspects of the engine performance such as exhaust gas emissions. This data regulates the signals which are provided by the engine control module to control the electronic fuel injection and the electronic ignition systems. Thus, for the engine to run properly the engine control module may need signals from the exhaust gas emissions based on which it can adjust the engine's operation. The engine control module may also monitor other characteristics of the environment, such as temperature and barometric pressure, that effect the performance of the engine. The engine control module may also have embedded in it base line values needed for the operation of the engine. Thus if the engine control module or engine sensors are not functioning properly the engine may malfunction and, in some cases, will not function at all.

With today's complex engine control strategies tailored to maximize engine efficiencies and minimize environmental impact, the engine control module can be very complex. Some of the problems associated with the complexity of engine control modules can be overcome by providing dual processor units which can segment the control functions so that simpler processors can be used. These dual processors are programmed to provide redundancy so that if one processor fails, critical functions can be shifted to its companion processor and the engine will continue to operate. U.S. Pat. Nos. 5,267,542 and 5,233,964 are two patents which teach the use of dual processors for an engine control module.

While such a dual processor engine control module will increase reliability of the engine control module, to date, there has been no engine control module where multiple processors share information and interact with each other in a manner which will allow one processor to take control of the functions of a second processor while maintaining the second processor in its current active state. Furthermore, no processors are currently available which can switch control back and forth between two processors without disruption to the engine or to either processor. Lastly, no engine control module to date can be programmed by the user to provide a user control mode providing test patterns for operating the engine and thereafter return the operation of the engine to run in its normal mode. Thus there is a need for a processor which can be used as an engine management system which will allow an engine to be tested while benefiting from the information maintained in the engine control module.

OBJECTS OF THE INVENTION

It is an object of the invention to provide an engine management system that will intermittently take control of the fuel injection system and/or ignition system of an engine.

It is another object of the invention to provide an engine management system that will allow the control to be passed back to the engine control module in an orderly and reproducible manner.

It is another object of the invention to provide an engine management system that will keep the engine control module active in its normal running state when the control has been relinquished to the engine management system.

It is yet another object to provide an engine management system that is programmable and can control the engine providing a controllable/programmable fueling rate, injection timing, ignition timing, and ignition coil dwell time.

It is another object of the invention to provide an engine management system which, when used in combination with an engine, will allow combustion research to be conducted.

Still a further object of the invention is to provide an engine management system, which in combination with an engine is well suited for emission control research.

It is still another object of the invention to provide an engine management system for the testing of the sensors for the engine.

It is yet another object of the invention to provide an engine management system which will allow a user to control the engine and can benefit from the information which has been programmed into the engine control module.

These and other objects of the invention will be apparent from the following description, drawings and claims.

SUMMARY OF INVENTION

The present invention provides a testing system for an engine and more particularly an engine management system for an engine having an electronic fuel injection system as well as for engines that have both an electronic fuel injection system and an electronic ignition system. The engine management system allows the engine to operate under an engine control mode for calibration and a user control mode where the engine can be run under the user's control. The engine management system also provides a smooth transition between the two modes.

When the engine is under the engine control mode, which is the normal mode of operation of the engine, an engine control module controls the electronic fuel injection system and the electronic ignition system. The engine control module is part of the factory equipment provided with an engine. The engine control module regulates the electronic fuel injection and electronic ignition when the engine is in service.

When the engine operates the user control mode the engine is controlled by the engine management system and is responsive to user defined inputs to the engine management system. The engine management system allows the user to develop test cycles distinct from the cycles which would be generated by the engine control module.

The user control mode, in turn, can be either one of joint control in which case signals from the engine control module and user defined inputs to the engine management system jointly control the engine; or an independent control in which case the engine management system controls the engine. While the engine is running in either of the control modes, the engine control module continues to operate. Keeping the engine control module active allows a smooth transfer of the control of the engine between the user control mode and the engine control mode. Keeping the engine control module active also provides the engine management system control values and signals produced by the engine control module.

In the engine control mode, the engine control module of the engine controls the electronic fuel injection system. The engine control module, in response to feedback from various position sensors and exhaust gas sensors, generates an injector control signal which opens and closes fuel injectors in the engine. The injector control signal is composed of injector pulses having an injector pulse width, the pulse widths having time dependent falling and rising edges which indicate, respectively, when the opening and closing of the fuel injectors will occur. The injector pulse widths determine the duration of fuel injection. The larger the injector pulse width, the more fuel is provided to the engine. The engine control module, via the injector control signal, can manage both the duration (by the pulse width) and timing (by setting the initiation of the pulses) of fuel injection.

The engine management system of the present invention, in an elementary form, has means for managing the electronic fuel injection system responsive to user defined signals. The engine management system also has means for supplying one or more artificial feedback signals to the engine control module when the engine is operating in the user control mode. Means are provided for smoothly transferring the engine between the user control mode and the engine control mode.

The means for managing the electronic fuel injection system. responsive to user defined signals, in turn, has means for defining the injector pulse widths by providing at least one set of user defined injector pulse widths which allow the operator to regulate the fuel supply to the engine's fuel injectors.

The user defined injector pulse widths can be generated from a set of values selected by the operator or by an algorithm or routine supplied by the operator. Either method can be processed by a central processing unit (CPU) such as a microprocessor to provide a user defined array of injection pulse widths.

To control the electronic fuel injection system in a more flexible manner, in addition to controlling the injector pulse widths, it is preferred that means for controlling the injector timing be provided. The means for controlling the injection timing determines when injection of fuel into the engine should begin.

When the electronic fuel injection system is jointly controlled by the engine management system and the engine control module, the means for controlling the injector timing can be accomplished by monitoring a reference injector signal for each injector control signal generated by the engine control module and using these reference injector signals as a trigger to begin injecting fuel. If the user wants to advance or retard the injection timing the CPU of the engine management system can transform the reference injector signals in accordance with user defined inputs or a user defined algorithm programmed into the CPU. For example, a constant could be added to the location of the falling edge of each pulse thereby advancing the timing of fuel injection.

Joint control of the injector timing by the engine control module and the engine management system is preferred even if the injector timing is to be modified from the timing set by the engine control module. Since the engine control module maintains the injector timing needed to sustain the engine, using the engine management system to modify the injector timing is easier than establishing injector timing from various engine sensors. For slight modifications in injector timing, the user may simply make small alterations to the reference injector signal by delaying or anticipating the injector control signal of the engine control module.

If independent control of the injector timing is required, a sensor or sensors which indicate to the engine management system crankshaft position or piston position are needed. A crankshaft encoder can be employed which will produce a set number of pulses per 360 degree rotation. When a crankshaft encoder is employed, the engine management system counts the pulses as the engine rotates and begins injecting fuel to a given cylinder when the proper, pre-programmed, number of pulses (a given crank position or angle) have been counted. If the engine management system is programmed by the user with the proper position or crank angle at which each injector is to begin firing, then no information from the engine control module is needed and complete independent control of the injector timing is achieved.

Regardless of whether the engine is jointly or independently controlled by the engine management system, means for supplying the reference injector signal is required. The reference injector signal is generated indirectly by the engine control module. Under joint control the reference injector signal can provide injector timing.

The reference injector signal is produced by a series of circuits in the engine management system which monitors the injector control signal from the engine control module. In the engine control mode, when the engine control module is controlling the injectors, the injector control signals are generated by the engine control module interacting with an injector induction coil which opens the injectors. When the engine is in the user control mode, the injector control signal is generated by the engine control module interacting with an artificial electrical load similar to the injector induction coil. One such artificial electrical load can be a resistor in parallel with the injector induction coil.

It is preferred to employ an inductive circuit, rather than a resistive circuit, which will match the inductive load of the injector induction coil. It is also preferred to provide a means for switching the artificial electrical load off when the engine control module is controlling the injectors. This is to avoid the engine control module sensing the presence of a second electrical load when it is in control of the injectors.

The reference injector signal is used by the engine management system to generate an artificial exhaust gas signal. Under the engine control mode, exhaust gases are monitored and exhaust gas signals are provided to the engine control module by exhaust gas sensors as part of the information used in running the engine. Means for supplying the engine control module with simulated exhaust gas signals generated by the engine management system for each of the exhaust gas sensors are provided. Such simulated exhaust gas signals are required since current engine control modules monitor the exhaust gas and use this information in controlling the engine's fuel injection system. The simulated exhaust gas signals are provided to the engine control module when the engine's injectors are being controlled by the engine management system. These simulated exhaust gas signals allow the engine control module to continue to function as if the exhaust gases were varying in chemical composition as they would if the engine control module were controlling the injectors. The engine control module depends on the exhaust gas signals as feedback to the engine control module for altering of fuel flow to the engine. If the engine control module alters fuel flow and a corresponding change is not seen on the exhaust sensor, then the engine control module will not function "normally". If the engine control module does not continue to function normally it will not be able to share in control of, or totally regain control of the engine's fuel injection system without a momentary malfunction or disruption.

The simulated exhaust gas signals can be supplied by a user defined algorithm. The algorithm is a transform of the reference injector signal. The algorithm can be processed by the central processing unit such as a microprocessor to provide the simulated exhaust gas signal.

The means for smoothly transferring control of the engine between the user control mode and the engine control mode include means for switching control of the engine fuel injection system between the engine management system and the engine control module as well as means for switching between the simulated exhaust gas signals and the exhaust gas signals generated by the exhaust gas sensors.

Preferably, the means for switching the electronic fuel injection system between the engine management system and the engine control module will have an injector relay for each injector of the fuel injection system. An injector flag is generated by a logic circuit or preferably by the CPU for each injector relay. This flag is generated based on user supplied input as to the cycle pattern for the test. The injector flag defines the desired injection mode, i.e. whether the engine control module or engine management system controls the injectors. An injector relay control logic circuit is provided for each injector relay. The injector relay control logic circuit monitors the output of a rising edge of the reference injector signal. The rising edge and the injector flag are decoded by the injector relay control logic circuit which activates the injector relay only when both the injector flag indicates a change in mode and the rising edge are present. This assures that control of the injectors switches just as the injector closes providing the maximum time for the transfer before the same injector next opens again during the next cycle.

It is further preferred that, when the engine is operating under control of the engine control module, an average injector pulse width of the reference injector signal can be obtained. The average pulse width values can be stored and used as a reference for generating the simulated exhaust gas signals.

Once control of all the injectors has been returned to the engine control module, the engine control module is returned to the exhaust gas signals from the exhaust gas sensors. Preferably, the means for switching the engine control module between the exhaust gas sensor's signals and the simulated exhaust gas signals is provided by an exhaust gas relay. Means for the CPU to control the exhaust gas relay is provided by an exhaust gas relay driver. The exhaust gas relay driver is used to change the state of the exhaust gas relay between the simulated exhaust gas signal and the exhaust gas signal from the exhaust gas sensor. An exhaust gas relay driver is provided for each of the exhaust gas sensors. The CPU provides a time delay between switching control of the injector and switching the exhaust gas signals. This delay assures that all exhaust gases produced by the engine while under the engine management system have cleared the exhaust system and will not be sensed by the exhaust gas sensors.

In a preferred embodiment, the engine management system is provided with means for managing the electronic ignition system responsive to user defined signals. Under normal engine operations, when the engine management system is not present or not equipped to control the electronic ignition system, the engine control module controls the electronic ignition system via ignition control signals. The ignition control signals determine timing of ignition and dwell time of charge on ignition coils in the engine. The closer the dwell time is to the time needed to saturate the charge of the coil the greater the charge that builds up on the ignition coil and the larger the spark emitted by spark plugs in the engine will be.

The means for managing the electronic ignition system responsive to user defined signals includes means for defining the dwell time for charging the ignition coil and means for defining the ignition timing. When the engine management system is equipped to control dwell time for the ignition system, the ignition control signal from the engine control module is sent to a signal conditioner in the engine management system, rather than directly to the ignition coil. The ignition control signal is translated by the signal conditioner into a computer compatible reference ignition signal. The reference ignition signal retains all the information from the ignition control signal (i.e. dwell time and ignition timing) and can, therefore, be used for joint control of the ignition system.

Currently, some ignition systems require multiple independent ignition control signals, one for each spark plug, while most ignition systems require only a single ignition control signal which is read by a control circuit on the engine and used to regulate the ignition dwell and timing for all of the spark plugs. To switch control of the ignition system to a user control mode, the engine management system needs a means for switching the ignition control signal from the ignition control signal produced by the engine control module to an alternate ignition control signal generated by the engine management system. In the most common present day engine configuration, where one ignition control signal regulates the dwell and timing in all of the cylinders, 4, 6, or 8 signals for a four, six or eight cylinder engine, will be sent by the engine control module during each engine cycle.

It is currently preferred that the means for switching the ignition control signal be a mechanical relay since its state is defined in the case of a power loss. A mechanical relay can be set to default control of the ignition to the engine control module if power to the system fails thereby protecting the engine from potential damage which could occur if the engine fails to receive an ignition signal at the appropriate time.

Although mechanical relays can switch fast enough to switch from the alternate ignition control signals to the ignition control signals from the engine control module which occur once per two engine revolutions in a four stroke engine, the mechanical relays are too slow to switch a single ignition control signal which is used to control all the spark plugs in the engine. A misfire would more than likely occur if the control signal to one or more of the spark plugs fail to receive an ignition signal during the relay transition. Since a misfire is not desirable the current mode of operation is to have the relay always closed so that the ignition system is connected to the engine management system. In the engine control mode, when the engine control module is controlling the ignition system the reference ignition signal is used to simply have the engine management system mimic the engine control module's ignition control signal. In a user control mode, the engine management system can alter the reference ignition signal to affect ignition timing and dwell time.

It should be appreciated that if multiple ignition control signals exist and they are active once per engine cycle, mechanical relays can be used to switch control of each signal. In this case switching of control of the ignition system by the engine management system would more closely parallel that used in controlling the electronic fuel injection system described above.

In another preferred embodiment the means for switching the electronic ignition system between the engine management system and the engine control module will have an ignition relay for each ignition coil of the electronic ignition system. An ignition flag is generated by a logic circuit or preferably by the CPU for each ignition coil. The ignition flags define the desired ignition mode, i.e. whether the engine control module or engine management system controls the ignition coils. An ignition relay control logic circuit is provided for each ignition relay. The ignition relay control logic circuit monitors the output of a rising edge of the reference ignition signal. This signal is generated as the reference injector signal by allowing the electronic engine control modules ignition control output signal to control an artificial coil. The signal that results from the interaction is filtered and conditioned into a CPU/electronic compatible signal using a signal conditioner circuit. The rising edge of the ignition reference signal, which indicates the end of ignition, and the ignition flag are decoded by the ignition relay control logic circuit which activates the ignition relay only when both the ignition flag indicates a change in mode and the rising edge are present. This assures that control of the ignition coils switches just as the ignition coil has discharged through the spark plug. This provides the maximum time for the transfer before the same ignition coil must be recharged again during the next cycle.

Since some engine control modules have the ability to sense the firing of the spark plugs when ignition control is under the engine management system, the engine control module will detect its loss of a perceived firing and interpret it as an engine fault. One way for sensing the spark which is frequently used is that after firing a spark plug, the engine receives an ignition feedback signal from sensors in the engine. The ignition feedback signal could take the form of an ignition validation signal which confirms that a discharge across a spark plug has occurred. In order to keep the engine control module active to allow for either joint control in the user control mode or for switching back into the engine control mode, the engine control module must believe that it is in control of the ignition system, issuing the injector control signal and receiving the ignition validation signal to confirm successful firing of the spark plug. In this case, the engine management system must have the means for generating a simulated ignition validation signal.

The simulated ignition validation signal can be generated by monitoring the ignition control signals from the engine control module and as soon as the signals indicate the spark plug should fire, a simulated ignition validation signal can be generated by the CPU which provides a signal and information on the form the signal is to take to a D/A converter. The simulated ignition validation signal can be programmed to be a digital pulse or even an analog signal. It is presented to the engine control module through an ignition validation relay. The ignition validation relay is always set so that the simulated ignition validation signal is sent to the engine control module. Only during an emergency, such as a circuit or power failure, will the relay flip the signal so that the real ignition validation signal generated by the engine sensors will be allowed to enter the engine control module. It is preferred at this time to use mechanical relays which will continue to have defined stated in the event of a total power failure.

As discussed with regard to the ignition relay, these mechanical relays have limited switching speeds and therefore do not allow for switching control between the engine management system and the engine control module. If the need arose to switch the ignition validation signal between the engine control module and the engine management system a solid state relay could be used. This would eliminate the need to generate a simulated ignition validation signal when the engine control module is controlling the ignition system, but would leave the engine less protected in the event of a system failure.

It is also preferred that the engine management system be able to take control of the ignition timing. Under joint control, the engine management system can retard or anticipate the ignition timing of the reference ignition signal thereby advancing or retarding the ignition timing. The engine management system can also be equipped to take independent control of the ignition timing. For independent control, as in the case of the injector system, a crankshaft or piston position sensor is required along with a means for switching control between the engine control module and the engine management system while monitoring the engine control module's ignition control signals. By independently controlling the ignition timing, dwell, and the ignition validation signal complete independent control of the electronic ignition system can be achieved.

When a harness is employed to connect the engine and its peripheral sensors means are provided to selectively break the wires of the wiring harness and provide for interfacing the engine and its related peripherals with the engine management system.

In practicing the method of the present invention, the engine is stabilized at a pre-defined engine speed and load. After the engine is stabilized, it is run under its engine control module for a time sufficient to establish a baseline operation, for which the average pulse width of the injectors is calculated.

Control of the injector opening is transferred to a set of user defined pulse widths. While the engine is operating under the user defined pulse widths, a simulated exhaust gas signal is provided to the engine control module. The simulated signal is substantially equivalent to the exhaust gas signal when the engine is operating under the control of the engine control module.

Preferably, the transfer of the operation of the injectors to and from the user defined pulse widths is done by first monitoring the condition of the injectors before transfer is allowed. Transfer of control of the injector is delayed until the injector has just closed.

It is further preferred that changes in the control of the ignition system occur soon after each spark plug ignition. After the spark plug ignites, the ignition coil is discharged and in an idle state. This is the proper time to switch control between the engine control module and the engine management system control because it will limit the likelihood of extending or shortening the dwell time (charge time) of the coil.

The method, preferably, periodically returns the operation of the injectors to the control of the engine control module to allow calculation of a new average pulse width. The new average pulse width is compared with the earlier average and the user defined pulse widths can be scaled proportionally with respect to the change in the average pulse width to compensate for fluctuating variables such as temperature, barometric pressure and humidity.

The above discussed method of operation is particularly well suited for implementation with a computer.

BRIEF DESCRIPTION OF THE DRAWINGS

FIG. 5 illustrates an injector control card and an exhaust gas card which are used in combination with the central processing unit. The system has cards having dedicated circuity and processing capacity which complement the functions performed by the central processing unit. A separate card is provided for each injector.

BEST MODE FOR CARRYING THE INVENTION INTO PRACTICE

Figure 1:
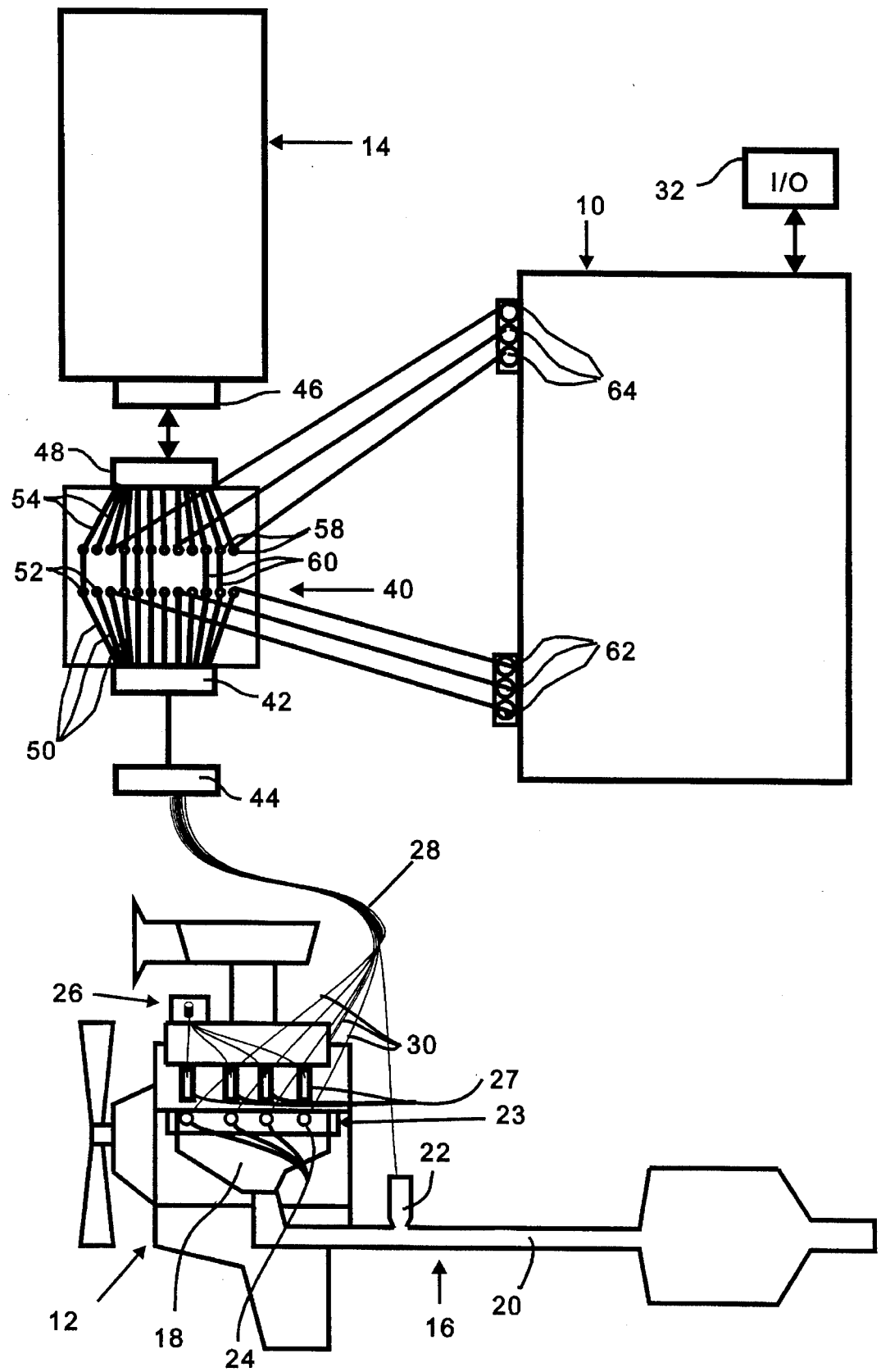
FIG. 1 schematically illustrates one embodiment of the present invention for an engine management system which is designed to manage an electronic engine injection system and an electronic ignition system. This embodiment is shown in combination with an engine having standard associated peripherals. The peripherals include an exhaust gas sensor, a wiring harness and an engine control module. The embodiment of FIG. 1 also includes a breakout box which breaks and redirects the signals passing through the wiring harness from the engine and associated peripherals.

FIG. 1 illustrates an engine management system 10 which is designed to be used in combination with an engine 12 and its electronic engine control module 14.

The engine 12 is connected to an exhaust system 16, having an exhaust manifold 18 and an exhaust pipe 20. The exhaust system 16 passes exhaust gases over an exhaust gas sensor 22. The engine control module 14 is provided for regulating the operation of the engine 12. The engine control module 14 provides an injector control signal having injector pulse widths which controls an electronic fuel injection system 23 and the opening of its fuel injectors 24 which, in turn, regulate the injection of fuel into the engine 12. The engine control module 14 also controls an electronic ignition system 26 of the engine 12. The electronic ignition system 26 controls the spark plugs 27 of the engine 12. The engine management system 10 allows the engine 12 to run in two modes. A user control mode is provided where the engine management system 10 controls the electronic fuel injection system 23 or the electronic fuel injection system 23 and the electronic ignition system 26. The engine management system 10 allows an engine control mode to be established which is the normal mode of an engine in operation. In the engine control mode the engine control module 14 controls the engine 12.

The exhaust gas sensor 22 monitors exhaust gases and provides data to the engine control module 14 on the composition of the gases passing through the exhaust system 16. This data is evaluated by the engine control module 14 and, depending on the data, the engine control module 14 adjusts the injector pulse widths which regulate the opening of the fuel injectors 24. When the engine 12 is operating under the engine control module 14 with feedback from the exhaust gas sensor 22, the engine 12 is said to be operating in an engine control mode. The engine control module 14 also makes adjustments for barometric pressure and other environmental parameters such as temperature to maintain an air fuel supply which will provide for near stoichiometric combustion of the fuel in the engine 12. The engine control module 14 is frequently programmed to provide an oscillating injector pulse width for the injectors 24 so as to provide a variable air/fuel ratio which oscillates around the stoichiometric level. Such oscillation has been found effective in increasing the efficiency of the catalytic process as discussed further in U.S. Pat. No. 5,119,629.

For the engine 12 illustrated in FIG. 1, the exhaust gas sensor 22 and the engine control module 14 are connected through a wiring harness 28. The wiring harness 28 contains a bundle of wires 30. The wires 30 connect various inputs/outputs of the engine control module 14 to particular components of the engine 12. Such components include the electronic fuel injection system 23, the electronic ignition system 26 as well as engine peripherals including the exhaust gas sensor 22. The engine management system 10 is provided to override selected functions of the engine control module 14, such as the injector pulse widths provided to the fuel injectors 24. The engine management system 10 of the present invention, in addition to the injector pulse widths, can vary injector timing as well as ignition timing and dwell of charge on the ignition coil. Ignition dwell determines the character of the of the spark discharge across the spark plugs 27.

The engine management system 10 has an input/output interface 32 which allows an operator to input data and instructions for setting the injector timing and injector pulse widths for the electronic fuel injection system 23 and the ignition timing and ignition dwell for the spark plugs 27 of the electronic ignition system 26. The signals generated by the engine management system 10 are responsive to the input data supplied via the input/output interface 32 and override the signals generated by the engine control module 14. Communication with the engine management system 10 is accomplished by breaking selected wires 30 from the wiring harness 28, which connect the engine 12 and the engine control module 14, and reconnecting the selected wires 30 through the engine management system 10. Similarly, information being passed by the wires 30 from the exhaust gas sensor 22 to the engine control module 14 is redirected through the engine management system 10. Preferably, a breakout box 40 is used to break the selected wires 30 in the wiring harness 28.

This interruption of the selected wires allows the engine management system 10 to control functions communicated through the interrupted wires. The breakout box 40 has a first breakout box connector 42 which connects with a harness connector 44. The harness connector 44, in turn, is designed to interface with an engine control module connector 46. The breakout box 40 has a second breakout box connector 48 which is designed to interface with the engine control module connector 46 so that the breakout box 40 can be interposed between the wiring harness 28 and the engine control module 14.

The breakout box 40 has input leads 50 which connect to contacts embedded in the first breakout box connector 42. These input leads 50 terminate with input terminals 52.

Similarly, output leads 54 connect to contacts embedded in the second breakout box connector 48. These output leads 54 terminate with output terminals 58. When jumpers 60 are connected between the input terminals 52 and the output terminals 58, signals will be passed directly from the engine 12 through the wiring harness 28 to the engine control module 14. Alternatively, when the input terminals 52 are connected to input jacks 62 of the engine management system 10 and the output terminals 58 are connected to output jacks 64 of the engine management system 10 the signals will be interrupted by the engine management system 10.

When the engine management system 10 is in control of the engine 12, it is preferred to keep the engine control module 14 operating normally to allow the engine management system 10 to use signals from the engine control module 14 or for the engine control module 14 to retake control of the engine 12. Furthermore, by maintaining the engine control module 14 active, the engine management system 10 can take joint control of the engine splitting the engine management tasks with the engine control module 14.

When the fuel injectors 24 are controlled by the engine management system 10, the signal from the exhaust gas sensor 22 is blocked and not received by the engine control module 14. In order for the engine control module 14 to continue to operate, the engine management system 10 must provide a simulated exhaust gas signal which reflects the signal that would have existed if control of the injectors 24 had been left with the engine control module 14.

The engine management system 10 generates a simulated exhaust gas signal for the engine control module 14 which indicates to the engine control module 14 that the exhaust being "sensed" is continuing to fluctuate as expected and accurately reflects the changes the engine control module 14 believes it is making in fuel flow. When the engine control module 14 is controlling the engine 12, the injector control signal is generated by the engine control module 14 to open and close the injectors 24. When the engine management system 10 is controlling the injectors 24, an artificial injector load is substituted for the injectors 24 to make the engine control module 14 believe it is still operating normally. The artificial injector load can be either an inductive or resistive circuit. The artificial injector load assures that the engine control module 14 will not sense that the injectors 24 have been disconnected from the engine control module 14 and control has been taken by the engine management system 10. The injector control signal generated by the interaction between the artificial injector load and the engine control module 14 can be used to generate a reference injector signal. The reference injector signal can, in turn, be used to generate the simulated exhaust gas signal.

An engine running continuously during an extended test (e.g. several days) will encounter changes in barometric pressure, temperature, and relative humidity. If constant fueling chemistry based on fixed fueling pulse widths preprogrammed by the engine management system 10 is desired, it will be necessary for the engine management system 10 to compensate these fixed values based on periodic checks of the changes. When the engine 12 is operating in the closed-loop condition under the engine control module 14, the environmental variables are sensed and the engine control module 14 alters the pulse width of the injector control signal to compensate for the variations. An average injector pulse width, calculated over time, can be used by the engine management system 10 as a basis for compensating for changes in environmental conditions.

In order to compensate for changes in environmental conditions without developing complex algorithms, it is preferred to periodically return the control of the engine 12 to the engine control module 14 and operate the engine 12 in the engine control mode for a period of time sufficient to calculate a new average pulse width. The new calculated average pulse width can be compared to the earlier average pulse width and a correction can be calculated for the environmental changes that have occurred. A suitable interpolation technique can be used to provide a scale for the pulse widths that will be used by the fuel injectors 24 to maintain a stable output when control of the engine 12 is returned to the engine management system 10. The time between returns to the engine control module 14 should be small (on the order of a few minutes) when compared to the period over which significant change in the environmental variables occur.

To effectively switch between the engine management system 10 and the engine control module 14 when the injectors 24 of the electronic fuel injection system 23 are being controlled by the engine management system 10, it is necessary that three functions be maintained. First, the engine control module 14 should remain active; second, the switching should transfer control between the engine management system 10 and the engine control module 14 when the injectors 24 have just closed; third, the simulated exhaust gas signal should be continued after transfer of the injectors 24 is made for a time sufficient to purge the exhaust system 16.

In order to provide an orderly transfer of the fuel injectors 24 between the engine management system 10 and the engine control module 14, it is necessary to keep the engine control module 14 actively operating so that it will be expecting to provide signals to the injectors 24 on demand. The simulated exhaust gas signal is generated by the engine management system 10 and supplied to the engine control module 14 so that when control is transferred back to the engine control module 14, it will be able to generate normal injector pulses. If the simulated exhaust gas signal is not present and/or not properly reflecting the anticipated signal pattern, then the engine control module 14 may interpret this as a malfunction. If such is the case, the engine control module 14 could switch to alternative backup strategies which are designed to allow the engine 12 and the vehicle it operates to continue functioning but in an undesirable manner. This undesirable manner could effect the results of a current test or cause other more destructive actions depending on the test being conducted. If control of the electronic fuel injection system 23 is returned to the engine control module 14 after it had sensed a malfunction, the results of the current test and/or hardware could be seriously affected. For example, the change in amount of fuel or even ignition timing may cause extra heat to be generated on the catalytic converter to a point where catastrophic damage to the catalytic converter occurs.

It will also be necessary to have a means for physically transferring control from one system to the other at a period of time when the injectors 24 have just closed. If control is switched while injection is underway or injection occurs during switching, the amount of fuel injected into the engine 12 will be incorrect. This is undesirable because it could affect the results of the ongoing test and could, over the long term, affect the durability and performance of the engine 12, especially if the switching occurred often.

The time lapse for switching signals from the simulated exhaust gas signal to the actual exhaust gas signal should be sufficient to allow purging of the exhaust system 16. This time lapse will be a function of the type of vehicle which the engine 12 will use. The time lapse prevents the engine control module 14 from sensing residual levels of exhaust gases resulting from operating the fuel injectors 24 under the control of the engine management system 10.

Figure 2:
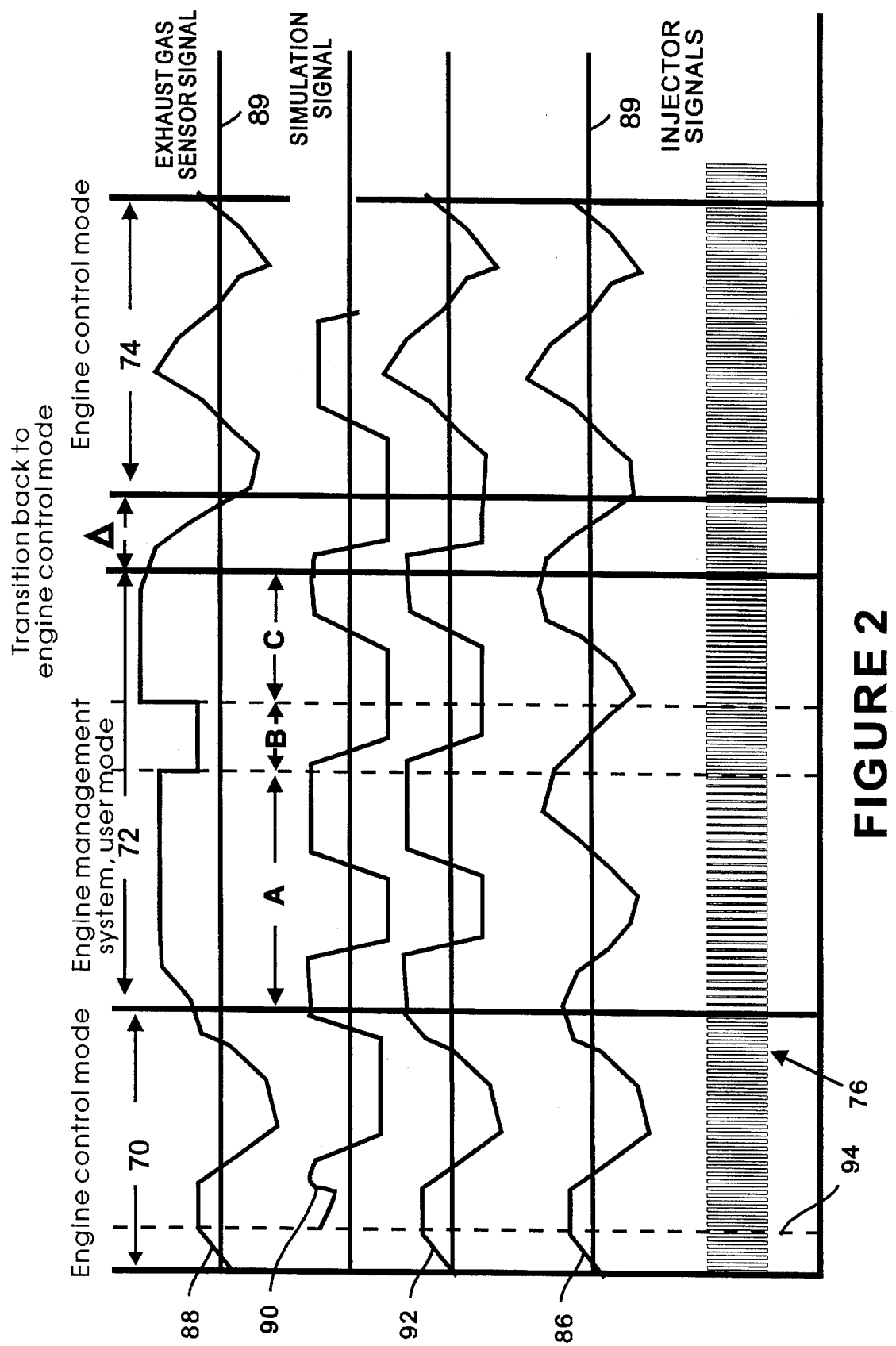
FIG. 2 illustrates the signals generated by the engine control module and the engine management system as a function of time. The signals shown include a cycle under control of the engine control module, a cycle under control of the engine management system, and a portion of a cycle under the control of the engine control module. A transition zone between the control of the engine management system and the engine control module is also shown. The signals are shown for one of the fuel injectors of the engine shown in FIG. 1 as well as the signal generated by an exhaust gas sensor and simulated exhaust gas sensor signal generated by the engine management system. The cycle under control of the engine management system is shown with three zones, each having a different injector pulse width.

FIG. 2 provides a schematic representation of various signals provided to the fuel injectors 24 from the engine control module 14 which meet the criteria set forth above. The horizontal axis in this figure is time and can be divided into four periods.

A first time interval 70 represents a period when the engine 12 is operating under the control of the engine control module 14 in the engine control mode. A second time interval 72 represents a time interval when the engine 12 is operating under the engine management system 10 in the user control mode. A third time interval Δ represents a period wherein transition is being made from the engine management system 10 to full control by the engine control module 14. A fourth time interval 74 represents another period of time when the engine 12 is under control of the engine control module 14 in the engine control mode.

Figure 3:
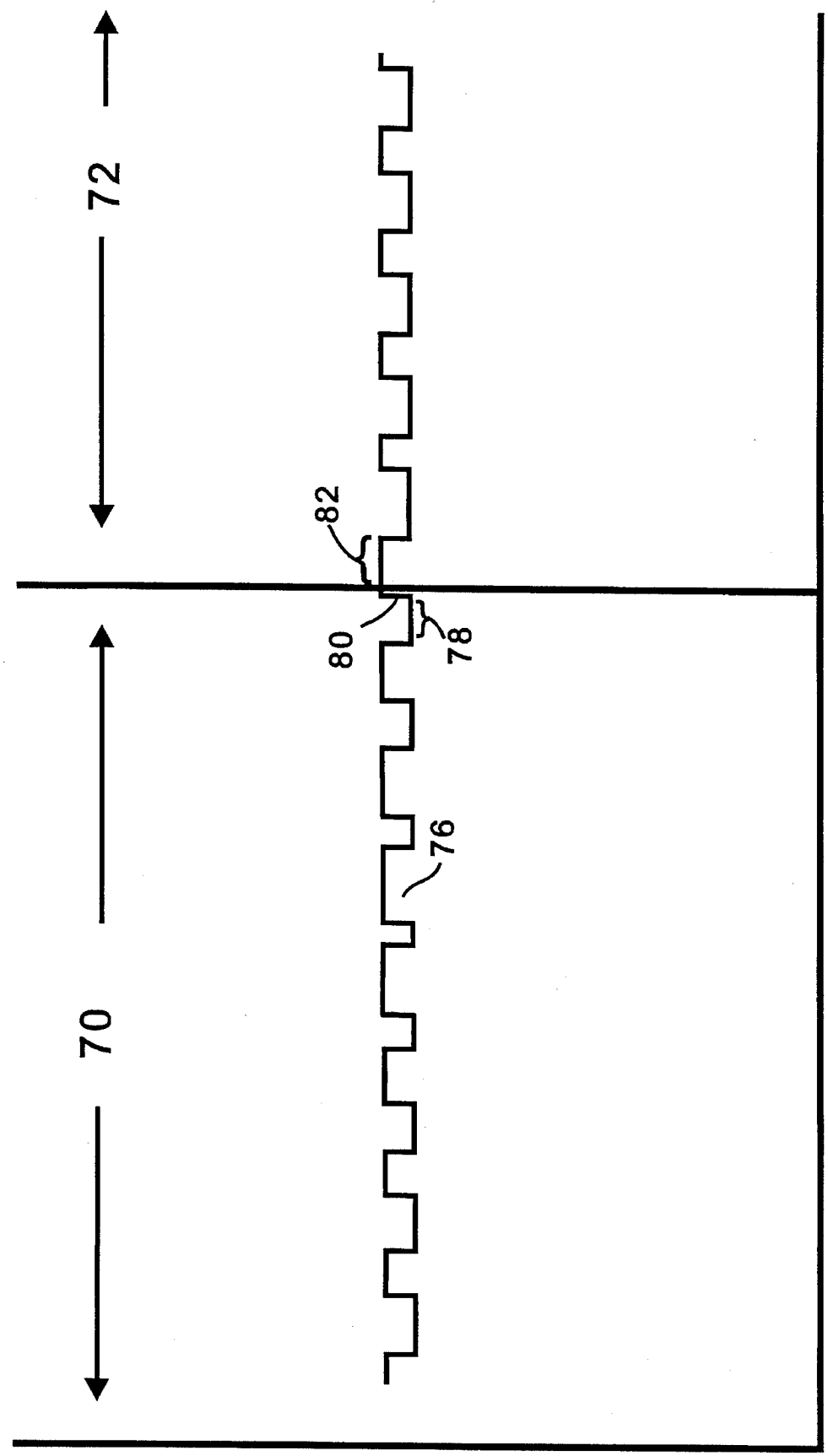
FIG. 3 illustrates, in greater detail, the variation in the pulse width for injectors which are generated by the engine control module and the phase relationship between the injector pulses that should be maintained when transferring between the engine control module and the engine management system.

During the first time interval 70, injector pulse widths 76, which control the time the injectors 24 are open, are generated by the engine control module 14. The injector pulse widths 76 oscillate as is better shown in FIG. 3. When the time reaches the end of the first time interval 70 and control is about to switch from the engine control module 14 to the engine management system 10 a reference injector pulse 78 of the reference injector signal is checked and transfer is forestalled until a rising-edge 80 of the reference injector pulse 78 has passed indicating the injector 24 has just closed. This will provide the longest period of time in which the transfer of control can occur before the next injection period. Similarly, when control is turned back to the engine control module 14, at the beginning of the third time interval Δ, the injectors 24 should have just closed. Having the transfer occur just after the injectors 24 close avoids injection of an air/fuel mixture during the transfer of control which could cause a partial injection and allows the maximum time for the injectors 24 to adjust to the engine control module 14 before the injectors 24 are triggered again.

In the second time interval 72, the character of the injector pulse widths 76 will be set by the user of the engine management system 10. As illustrated in FIG. 2, three cycles, A, B, and C, having a constant, but different, pulse width have been represented. During this time interval the timing of each injection could also be changed by delaying or anticipating the start of injection based on the reference injector signal; e.g. one could delay the injector control signal from the engine control module 14 by a few milliseconds and thereby alter the injector timing.

These user defined injector pulses widths 76 could also be created by making a mapping of the injector timing and injector pulse widths 76 while the engine 12 is running in the engine control mode, and recording the information for later playback when the engine management system 10 has control of the electronic fuel injection system 23.

Curve 88 shows the exhaust gas signal as a function of time during the first time interval 70 and during the second time interval 72. Curve 86 shows the exhaust signal as it might have been if control had remained with the engine control module 14. Curve 88 illustrates a signal generated by the exhaust gas sensor 22 as a function of time. As can be seen during the first time interval 70 where the engine 12 is operating in the engine control mode, the signal of the curve 88 is centered about a baseline 89 and tracks the signal of the curve 86 which in turn coincides with the period of the pulse width variation for the injectors 24 since it is the pulse width variations that cause the varying fueling levels, which in turn produces the varying exhaust gases which are sensed by the exhaust gas sensor 22.

However, when control of the injectors 24 is transferred to the engine management system 10 for the second time interval 72, the engine control module 14 can no longer alter the fueling level by altering the injector pulse widths, since the injectors 24 are being controlled by the engine management system 10. Therefore, the exhaust gases no longer track the variations in the injector pulse widths 76 which are being generated by the engine control module 14 as they would have if control had not been surrendered to the engine management system 10. The levels will now be responsive to injector pulse widths of the operator controlled cycles A, B, and C. Thus, the actual exhaust gas signal levels will not fluctuate about the base line 89 specified by the engine control module 14 and the exhaust gas signal from the exhaust gas sensor 22. Without such fluctuations, the engine control module 14 will sense a malfunction and respond by placing its operation into a default mode. The default mode can cause engine operating conditions which are undesirable. Thus, during the second time interval 72, it is necessary to generate a simulated exhaust gas signal, as is shown in curve 90. In general, the generation of the simulated exhaust gas signal represented by the curve 90 is started before the time when control of the injectors 24 is given to the engine management system 10.

The simulated exhaust gas signal 90 can be generated by a variety of transformation techniques which convert the injector pulse widths 76 produced by the engine control module 14 while it interacts with the artificial injector load, into the simulated exhaust gas signal 90.

During the time when the injectors 24 are controlled by the engine control module 14, the actual exhaust gas signal 88 is presented to the engine control module 14 and when control of the injectors 24 is given to the engine management system 10, the simulated exhaust gas signal 90 is presented to the engine control module 14. The exhaust gas signal input of the engine control module 14 is shown in FIG. 2 as a signal 92. The signal 92 is the resultant signal which is generated by the exhaust gas sensor 22 and the simulated exhaust gas circuitry. It is presented to the engine control module 14 during operation of the engine management system 10. Notice that during interval 70 the actual exhaust gas signal 88 is present on the trace 92, and that during interval 72, the simulated exhaust gas signal 90 is present on the trace 92. This allows the engine control module 14 to always monitor a seemingly valid exhaust gas signal.

Figure 4:
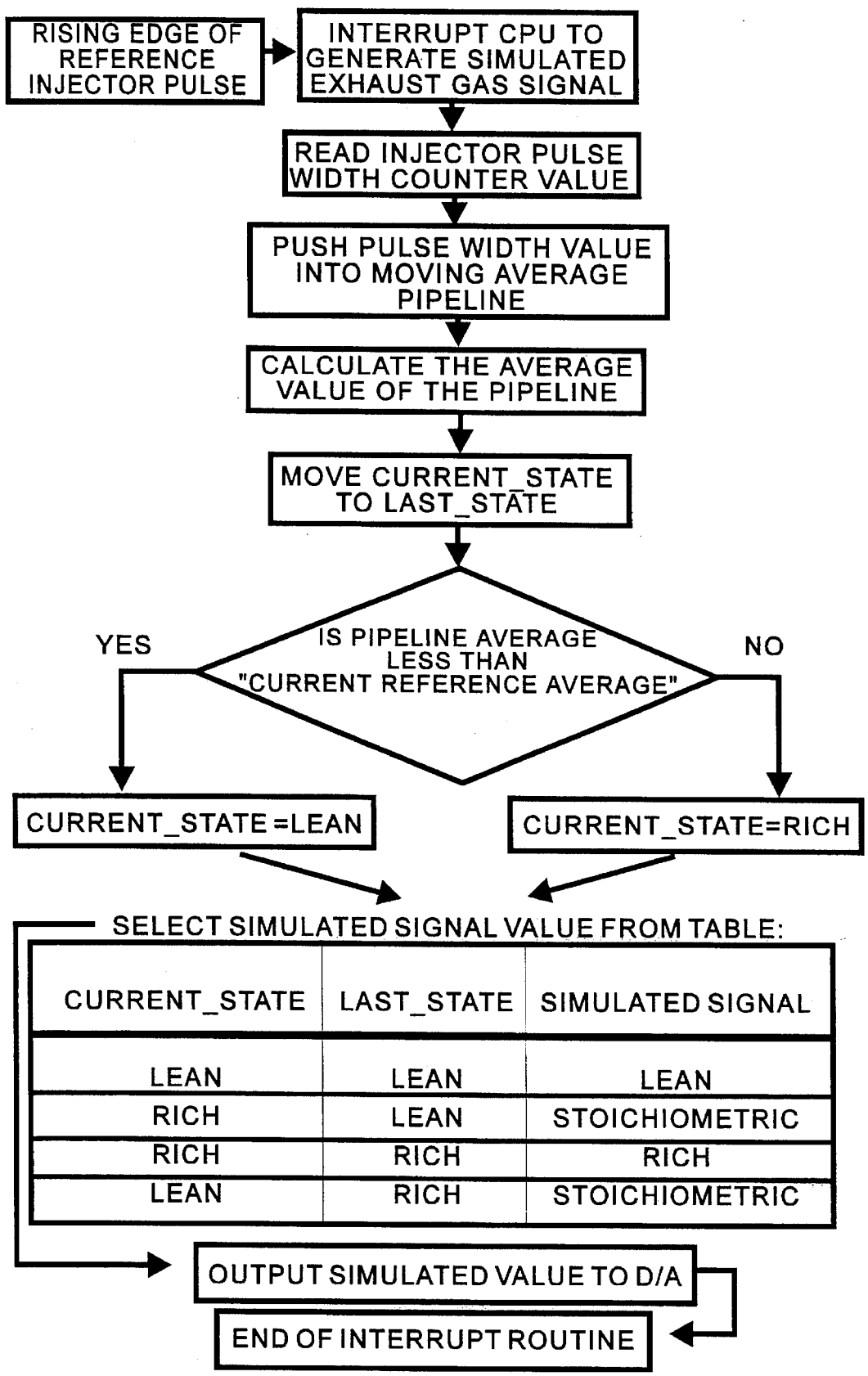
FIG. 4 is a flow diagram describing an algorithm for generating a simulated exhaust gas sensor signal. The algorithm is based on a four point averaging technique which is used to determine a pseudo value of the signal. The values on which the averages are based are injector pulse widths that are provided by the engine control module. These are the pulses that would have been provided to the injectors if the engine were operating under engine control (normal) conditions. These pulses are generated by the engine control module as its pulsing signal interacts with an artificial load.

FIG. 4 is a depiction of one particular embodiment for generating the simulated exhaust gas signal using a transformation. In this embodiment, the average value of the injector pulse width is calculated based upon a series of injector pulse widths. The pulse widths are measured off the reference injector pulse, while the engine control module 14 is controlling the actual injectors 24 in the engine control mode, as described earlier. The calculation is initiated at time 94 (as shown in FIG. 2) which is before the beginning of the second time interval 72 to allow time for the transformation to get started, and to produce the correct results. Since the simulated exhaust gas signal must be ready at the end of the first time interval 70 the transformation is initiated early and the resultant signal is not allowed to pass to the engine control module 14 until such time as control is taken over by the engine management system 10.

This simulated exhaust gas signal will continue to be used throughout the second time interval 72 when in the user control mode and will continue thereafter for the third time interval A, since the exhaust gas signals generated by the exhaust gas sensor 22 will still be controlled by the residual gas in the exhaust system 16. The third time interval A of about 250 to about 500 milliseconds will be sufficient to purge the exhaust system 16 of the gases generated before control is returned to the engine control module 14. Thereafter, the simulation can be discontinued, since the injectors 24 are under control of the engine control module 14.

When the simulation technique used for the engine management system 10 is being generated by a central processor (CPU), which is also operating the engine management system 10, FIG. 4 illustrates a method for implementing the averaging process of the reference injector pulse used in generating a simulated exhaust gas signal. When the rising edge 80 of the reference injector pulse 76 is sensed indicating the end of injection, the rising edge 80 causes an interrupt in the operation in the central processor causing it to execute a service routine. The first step of the service routine is to read the reference injector pulse width value from a pulse width counter through which the reference injector pulse is passed. This value is stored in a pipeline register of N consecutive values maintained in a first-in-first out (FIFO) fashion. Preferably, N is a small number between 2 and 6. The value of the numbers contained in the pipeline are then averaged.

In order to obtain meaningful values, there is an initial start-up time required during which dummy values must be created. The dummy values can be residual values in the pipeline register left over from preceding operations. As discussed earlier, a lead time to start the calculation must be provided before such time as meaningful values are required.

Since the response of the engine control module 14 to the exhaust gas signal is based on recognition of the oscillation of the exhaust gas signal relative to the mean value (STOIC), the artificial exhaust gas signal can be generated by treating the signal as having a state value of either LEAN or RICH, LEAN being below the STOIC value and RICH being above STOIC. In order to determine the character of the simulated exhaust gas signal a table is provided in the routine which defines the value of the simulated exhaust gas signal given the current state and the last state. When this method is used for each iteration, the current state value is moved to a last state value register and the average of the pipeline is compared with the current average which was generated earlier when the system was operating under the engine control module 14.

If this comparison yields a pipeline average less than the current referenced average, then the current state is set equal to LEAN, alternatively, the current state is set equal to RICH.

Based on the past value of the current state and the last state, a simulated signal is digitally generated according to the logic table in FIG. 4. The digital signal can be converted to an analog signal using a D/A converter and for the example set forth, will generate the simulated exhaust gas signal with the period set forth in FIG. 2.

Figure 5:
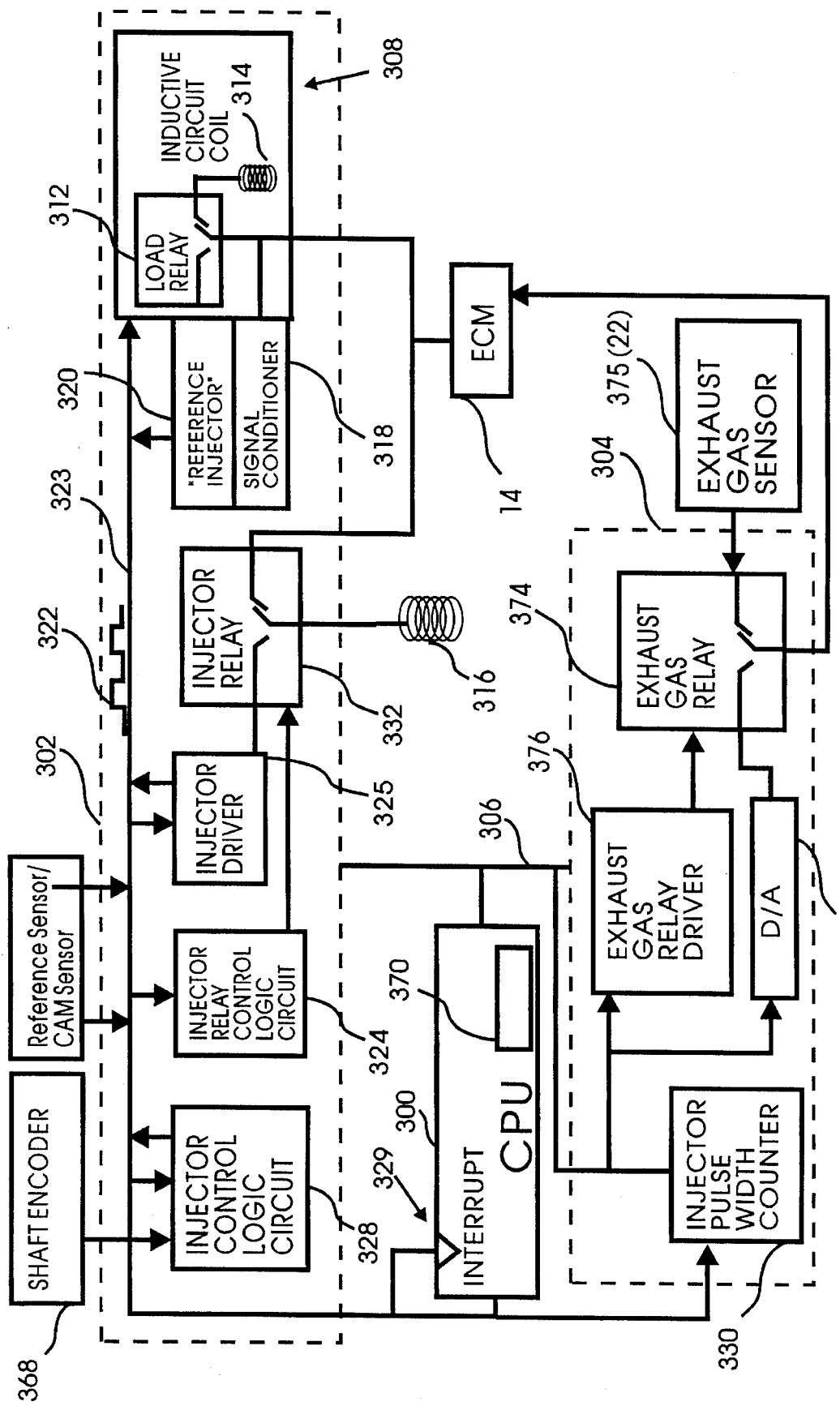
FIG. 5 is a schematic of part of an engine management system for an injection system which employs a central processing unit.
Figure 6:
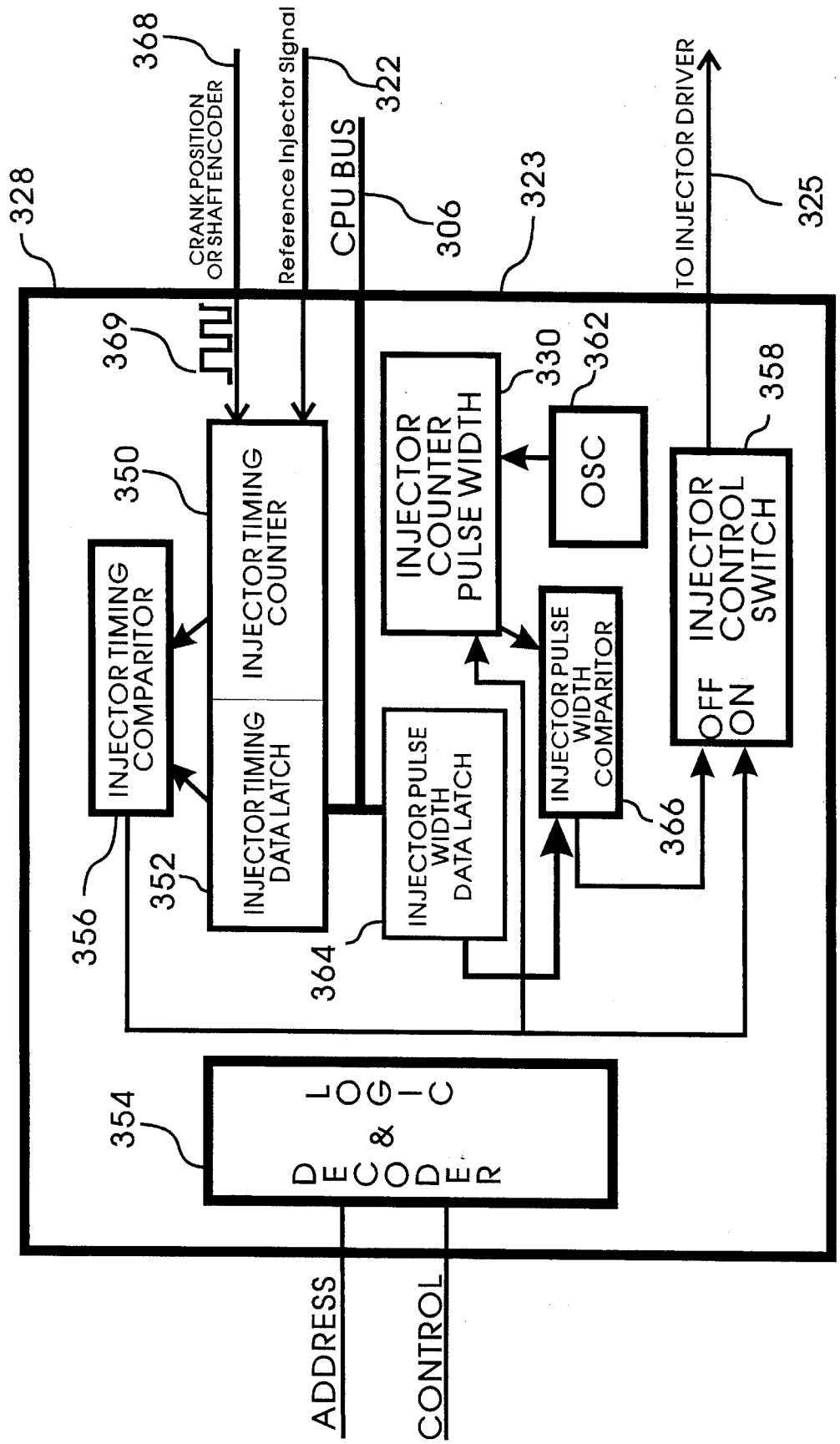
FIG. 6 is a block diagram illustrating additional details of the injector control logic circuit shown in the block so labeled in FIG. 5.

FIGS. 5 and 6 illustrate block diagrams for a representative logic suitable for the engine management system 10 of FIG. 1 which will control the electronic fuel injection system 23. This logic includes a central processor (CPU) to control the engine management system 10.

FIG. 5 provides a block diagram illustration of a CPU 300 communicating with an injector card 302 which is one of several. There is an equivalent injector card 302 for each cylinder. FIG. 5 also illustrates the CPU 300 communicating with an exhaust gas simulator card 304. In practice, there may be multiple similar exhaust gas simulator cards 304, one for each exhaust gas sensor 22. The injector card 302 and the exhaust gas simulator card 304 communicate through a common CPU bus 306.

The injector card 302 has an inductive circuit 308 connected to the engine control module 14 through a load relay 312 in parallel with an injector induction coil 316. The inductive circuit 308 has an inductive circuit coil 314 which matches the induction load of the injector induction coil 316 which is employed to open and close an injector 24. The inductive circuit coil 314 serves as an artificial load on which the engine control module 14 can pull when the engine 12 is in the user control mode. The inductive circuit 308 is connected via the load relay 312 so that the artificial load from the inductive circuit coil 314 can be isolated from the engine control module 14 when it is controlling the electronic fuel injection system 23 in the engine control mode so as not to allow the engine control module 14 to sense the presence of the inductive circuit coil 314. If the engine control module 14 is equipped to monitor the load required to open the injectors 24, the presence of a second load could be interpreted as a fault and could lead the engine control module 14 to shut down one or more of the injectors 24 or execute an alternate, non-"normal" algorithm.

The injector control signal passes through the inductive circuit 308 and is processed by a signal conditioner 318 which limits the voltage of the signal to eliminate spikes. A signal scaler 320 generates a reference injector signal providing the appropriate electronic conversion from engine voltage levels to levels which are computer logic compatible thereby creating a reference injector signal 322. The reference injector signal 322 is input via an injector card bus 323 to an injector relay control logic circuit 324, an injector driver 325, and an injector control logic circuit 328. A CPU interrupt input 329 and an injector pulse width counter 330 also have the reference injector signal 322 as an input.

The injector relay control logic circuit 324 is designed to switch an injector relay 332 so that either the engine control module 14 or the injector card 302 of the engine management system 10 controls the injector induction coil 316. The injector relay control logic circuit 324 receives data from the CPU 300 via the CPU bus 306 and receives signals from the inductive circuit 308 via the injector card bus 323. The data sets an injector flag within the injector relay control logic circuit 324, indicating the mode of operation of the injector relay 332. The mode simply defines which entity (the engine control module 14 or the engine management system 10) has control of the injector induction coil 316. However, the switching of the injector relay 332 is not performed immediately upon completion of the cycle of the engine control module 14. Instead, the switching is synchronized with the reference injector signal 322 being timed with respect to the rising edge 80 illustrated in FIG. 3 signifying the end of injection. By synchronizing to the rising edge 80, an injector 24 activated by the injector induction coil 316 has just completed its injection allowing for the maximum time to completely switch the injector relay 332. This maximum time period is illustrated by time interval 82 in FIG. 3. The rising edge 80 is sensed by standard flip flop gates in the injector relay control logic circuit 324.

FIG. 6 provides a block diagram of logic for the injector control logic circuit 328 which will provide independent control of the injectors 24 by the engine management system 10 or joint injector control by the engine management system 10 in conjunction with the engine control module 14.

For joint control, the engine control module 14 provides injector timing by interacting with the inductive circuit 308. The inductive circuit 308 provides the CPU 300 and the injector control logic circuit 328 with the reference injector signal 322. The reference injector signal 322 is carried by the injector card bus 323. An injector timing counter 350 is set to zero while an injector timing data latch 352 is set to 1 by the CPU 300 via a decoder 354 and the CPU bus 306. As soon as the reference injector signal 322 is passed through the injector card bus 323 and enters the injector timing counter 350, it increments the value from zero to 1. An injector timing comparator 356 identifies the match between the injector timing data latch 352 and the injector timing counter 350. The injector timing comparator 356 immediately sends a signal to an injector control switch 358 which sends a signal to the injector driver 325 which produces an alternate injector control signal to turn on an associated injector driven by the injector coil 316. The associated injector is the injector 24 the engine control module 14 would be controlling if it were actually controlling the electronic fuel injection system 23. The injector timing comparator 356 also sends a signal to the injector pulse width counter 330 to begin counting pulses from an injector pulse width oscillator 362. An injector pulse width data latch 364 is set to a user defined value by the CPU 300 via the CPU bus 306 and the decoder 354. The user defined value represents the amount of time the associated injector driven by the induction coil 316 will be kept open (pulse width). Time is measured by counting the number of pulses generated by the injector pulse width oscillator 362. The injector pulse width counter 330 counts these pulses and, since the time between the pulses is constant, the desired time can be achieved by counting a certain number of pulses. The certain number of pulses is contained in the injector pulse width data latch 364. When the injector pulse width counter 330 has counted the number of pulses as indicated by the injector pulse width data latch 364, an injector pulse width comparator 366 identifies the two values as being equal and sends a signal to the injector control switch 358, thereby turning off the injector 24 after the user defined time has passed. This process can be repeated with various values written into the injector timing data latch 352 which will alter the injection to the engine. This process is referred to as "joint control" because the timing is generated by the engine control module 14 while the pulse width is generated by the engine management system 10 through user commands.

Alternatively, independent control may be desired, in which case, the injector control logic circuit 328 can be configured by the CPU 300 via the CPU bus 306 and the decoder 354 to generate the injector timing independently. Independent control requires a position reference signal which preferably is a shaft encoder 368 which can be coupled to a shaft such as the drive shaft producing shaft encoder pulses 369 as the shaft rotates. A signal from an engine cycle sensor is also required to reference the shaft encoder 368 to a known position and to distinguish which half of the cycle the current rotation belongs to in a 4 stroke engine. The sensor may be a single camshaft position sensor or multiple sensors, one sensing a reference position the other sensing in which half of the cycle the engine is operating. The signals from the cycle sensors are passed to the CPU 300 via the injector card bus 323 and cause an interrupt of the CPU 300 which sends commands and data to the injector timing counter 350 setting it to zero. The injector timing counter 350 counts up from zero until the CPU 300 resets it after 720 degrees of rotation. Once the reference position is established, the shaft encoder pulses 369 can be counted and the position or timing of the injection of fuel can be set.

For example, if the fuel is to begin injecting after 30 degrees of engine rotation from the point at which the piston is at top dead center and if a shaft encoder 368 produces the pulse every 1 degree, then 30 pulses would need to be counted before fuel injection begins. The shaft encoder pulses 369 enter the injector timing counter 350 which counts the shaft encoder pulses 369. The injector timing comparator 356 compares the value from the injector timing counter 350 to the value in the injector timing data latch 352. The CPU 300 has written the desired value, which represents the number of encoder pulses 369 that must be counted, into the injector timing data latch 352. When the injector timing comparator 356 detects that the two values are equal, it sends a signal to the injector control switch 358, which sends a signal to the injector driver 325 which produces an alternate injector control signal to turn on the injector induction coil 316. The injector timing comparator 356 also sends a signal to the injector pulse width counter 330 to begin counting pulses from the injector pulse width oscillator 362. The injector pulse width data latch 364 is set to a user defined value by the CPU 300 via the CPU bus 306 and the decoder 354. The user defined value represents the amount of time the injector 24 will be kept open. Time is measured by counting the number of pulses generated by the injector pulse width oscillator 362. The injector pulse width counter 330 counts these pulses and since the time between the pulses is constant, the desired time can be measured by counting a certain number of pulses. The certain number is contained in the injector pulse width data latch 364. When the injector pulse width counter 330 has counted the number of pulses as indicated by the injector pulse width data latch 364, the injector pulse width comparator 366 sends a signal to the injector control switch 358, thereby turning off the injector 24 after the user defined time has passed. This process represents independent control since the engine control module 14 is not utilized.

When either joint or independent control of the injection system occurs, at least one simulated exhaust gas signal must be generated and sent to the engine control module 14. The simulated exhaust gas signal is generated by using the CPU 300 and at least one exhaust gas simulator card 304. The reference injector signal 322 passing along the injector card bus 323 enters the CPU interrupt input 329 to the CPU 300. The CPU 300 begins executing an interrupt routine 370. The purpose of the interrupt routine 370 is to generate the simulated exhaust gas signal. To produce the simulated exhaust gas signal, the interrupt routine 370 reads the value of the injector pulse width counter 330 located on the exhaust gas simulator card 304. This value is transmitted via the CPU bus 306. This value is then transformed and processed by the operator defined interrupt routine 370. One example of a transform function for the interrupt routine 370 is discussed in the text associated with FIG. 4. The output of the interrupt routine 370 is provided to a D/A converter 372 on the exhaust gas simulator card 304. The output voltage of the D/A converter 372 is passed to an exhaust gas relay 374 and is selectively presented to the engine control module 14 as requested by the CPU 300. The CPU 300 selects whether the exhaust gas signal from an exhaust gas sensor 22 or the simulated exhaust gas signal is presented to the engine control module 14 by setting an exhaust gas flag within an exhaust gas relay driver 376. The exhaust gas relay driver 376 then switches the exhaust gas relay 374 immediately upon receiving a new exhaust gas flag from the CPU 300 via the CPU bus 306. Since the switching of the exhaust gas relay 374 is immediate, the CPU 300 delays changing the flag when control of the injectors 24 is returned to the engine control module 14 sufficient to purge the gases produced while the engine management system 10 was in control of the injectors 24. The delay is usually about 250 milliseconds. If the purge does not occur, the possibility exists that the engine control module 14 may take undesired actions to correct what it perceives to be an engine problem.

Figure 7:
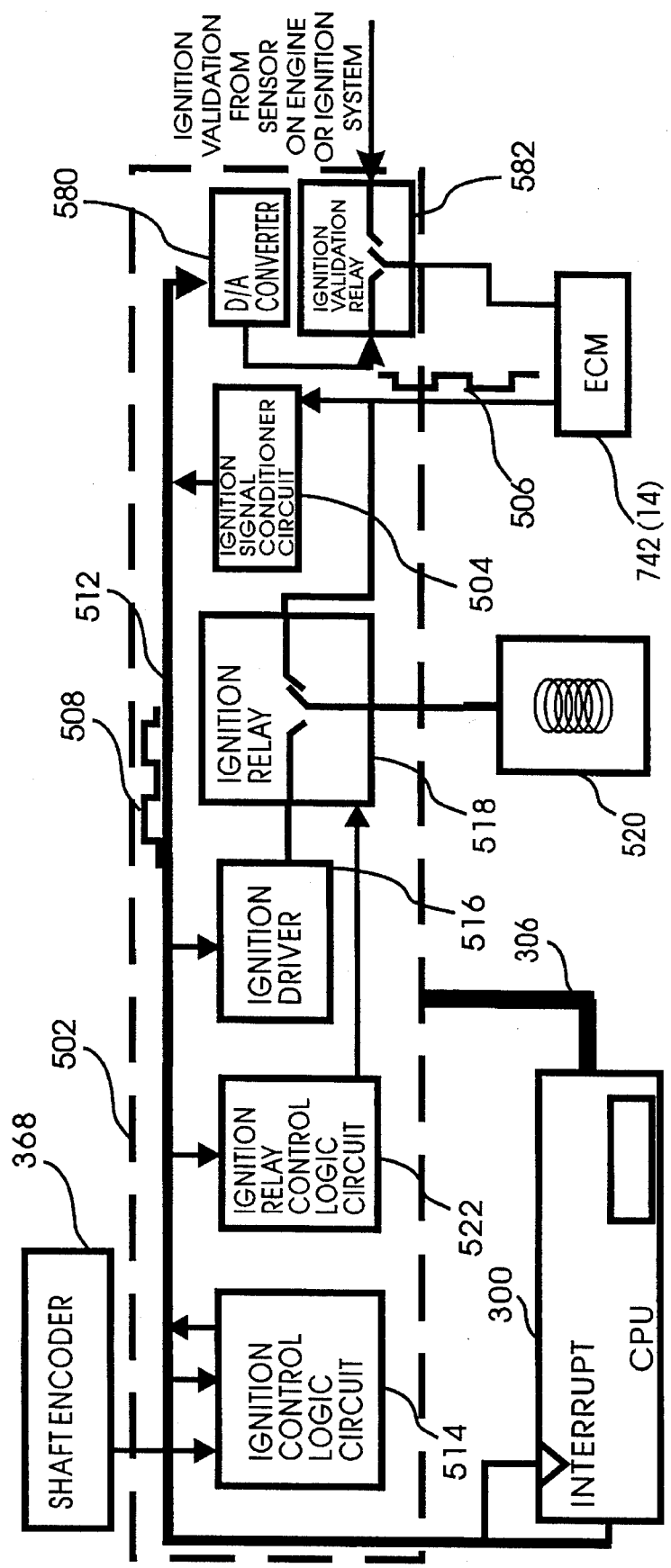
FIG. 7 is a schematic of an ignition control card which is similar to the injector control card of FIG. 5. The ignition card forms a part of the engine management system which employs a central processing unit to implement the system of the present invention. The system has cards having dedicated circuity and processing capacity which complement the functions performed by the central processing unit.

When it is desired to control the electronic ignition system 26 (shown in FIG. 1 and discussed in the related text) of the engine 12, additional control cards will be required. In a preferred embodiment, an ignition card 502 is employed in the engine management system 10, the logic of which is illustrated in FIG. 7. The ignition card 502 has an ignition signal conditioner circuit 504 which is used to read in at least one ignition control signal 506 from the engine control module 14. The ignition control signal 506 can be a command sent to another module which controls the engine's ignition system or it could be sent directly to at least one ignition coil 520. The actual configuration depends on the type of ignition system and the type of engine 12 control module being utilized by the engine.

It is current practice that when the engine management system 10 is configured to control the electronic ignition system 26, regardless of whether the engine 12 is in the engine control mode or the user control mode, the ignition control signal 506 is diverted to the engine management system 10. This approach has been taken for reasons which will be discussed later. For an engine management system 10 so configured, the ignition control signal 506 is conditioned by the ignition signal conditioner circuit 504 to provide a computer compatible reference ignition signal 508 and is sent to various circuits and the CPU 300 through an ignition card bus 512. In the engine control mode, an ignition control logic circuit 514 then generates an identical signal as that received from the engine control module 14. This identical signal is passed to an ignition driver circuit 516 and out an ignition relay 518 to an ignition coil 520. Since, currently, most engines are configured so that all the spark plugs can be controlled by a single ignition control signal 506 which is repeatedly generated during an engine cycle, a single ignition card 502 can be used to control the spark for all of the spark plugs 27. It is preferred to keep the ignition relay 518 closed always and to mimic the ignition control signal 506 exactly when the engine control module 14 is controlling the electronic ignition system 26.

The mimic technique is used since the ignition relay 518, if mechanical, can not switch fast enough to alternate control between the engine control module 14 and the engine management system 10 without the risk of misfiring one of the spark plugs 27. In a configuration where one ignition control signal 506 controls all of the spark plugs 27, discharges or sparks occur across the plug points and result in four, six or eight discharges per engine cycle. The frequency of discharges is too great for a mechanical relay to be switched without missing an ignition.

However, while a mechanical relay cannot react at a rate to allow switching, a mechanical relay is preferred over a high speed solid state relay because a mechanical relay is always in a defined state even when the power driving it is removed, as occurs when an engine management system has a power failure. If a circuit fault in the engine management system 10 is detected, the ignition relay 518 can be de-energized and control will automatically switch back to the engine control module 14. Although the engine 12 will sense the switching, in an emergency the engine 12 will be protected from long exposure to erroneous signals which could damage the engine 12 or ruin test results. The ignition relay 518 is controlled by an ignition relay control logic circuit 522 which receives commands from the CPU 300 via the ignition card bus 512.

The ignition system 26 can be controlled either jointly or independently of the engine control module 14. The logic is substantially similar to that of the injector control logic which controls the electronic fuel injection system 23. For joint control, the engine control module 14 provides the ignition timing and the engine management system 10 provides the ignition coil dwell. The ignition timing is provided by monitoring and conditioning the ignition control signal 506 from the engine control module 14. The ignition signal conditioner circuit 504 sends the reference ignition signal 508 to the ignition control logic circuit 514 and the CPU 300 via the ignition card bus 512. The ignition control logic circuit 514 contains the logical elements required to control the electronic ignition system 26 along with the CPU 300.

Figure 8:
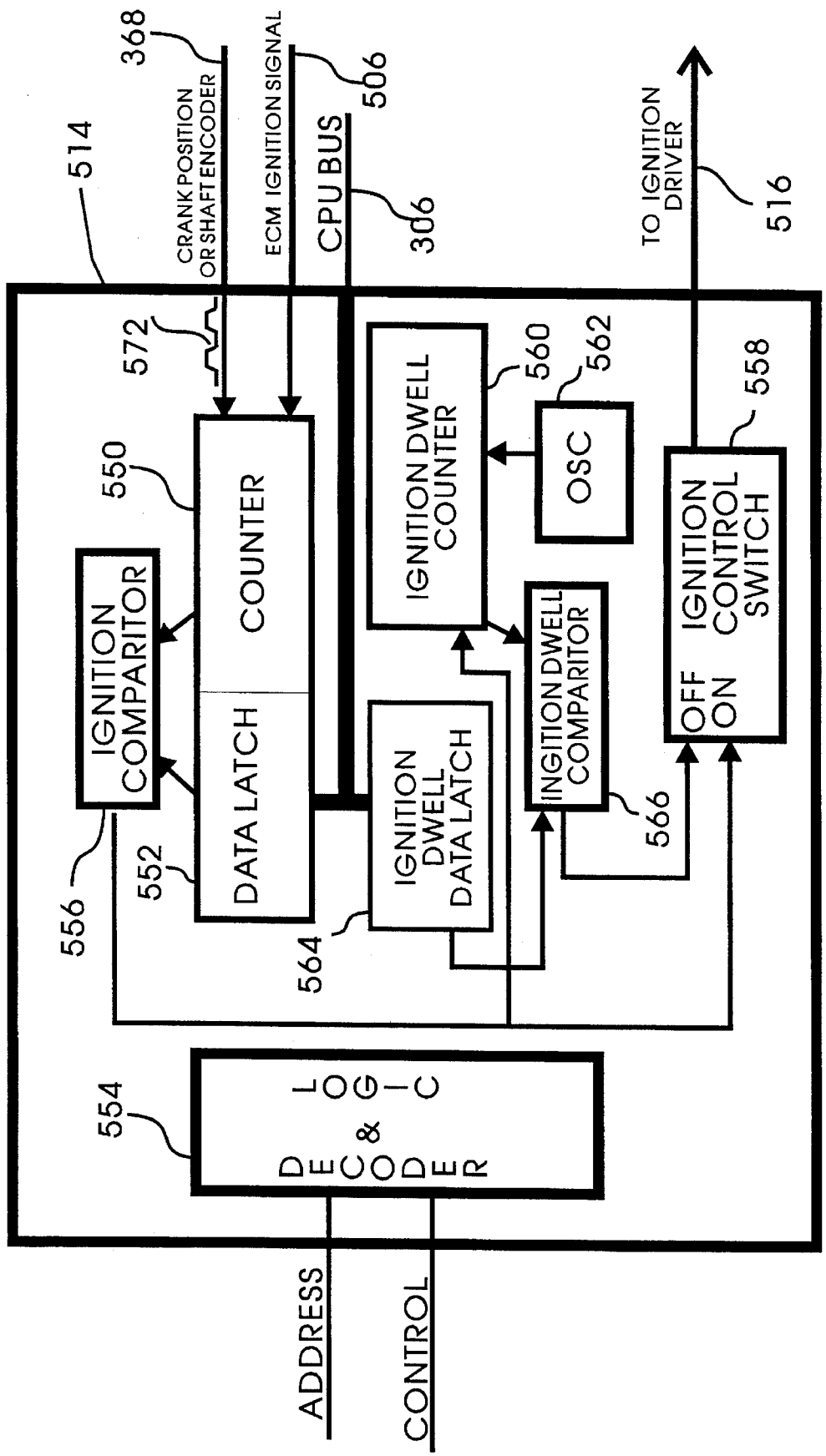
FIG. 8 is a block diagram illustrating additional details of the ignition control logic circuit shown in the block so labeled in FIG. 7.

FIG. 8 provides additional details on the ignition control logic circuit 514. For joint control, the ignition control logic circuit 514 has an ignition counter 550 which is set to zero while an ignition data latch 552 is set to 1 by the CPU 300 via a decoder 554 which interprets code sent by the CPU 300 along the CPU bus 306. As soon as the reference ignition signal 508, which is generated by the ignition signal conditioner circuit 504, is communicated via the ignition card bus 512 to the ignition counter 550 it increments its value from zero to 1 and an ignition comparator 556 identifies the match between the ignition data latch 552 and the ignition counter 550. The ignition comparator 556 immediately sends a signal to an ignition control switch 558, which activates the ignition driver 516 which produces an alternate ignition control signal, turning on the ignition coil charge up (dwell). The ignition comparator 556 also sends a signal to an ignition dwell counter 560 to begin counting pulses from an ignition oscillator 562. An ignition dwell data latch 564 is set to a user defined value by the CPU 300 via the CPU bus 306 and the ignition decoder 554. The user defined value represents the amount of time the dwell of charge on the ignition coil 520 will last before the spark is fired. Time is measured by counting the number of pulses generated by the ignition oscillator 562. The ignition dwell counter 560 counts these pulses, and since the time between the pulses is constant, the desired time can be achieved by counting a certain number of pulses. The certain number is contained in the ignition dwell data latch 564. When the ignition dwell counter 560 has counted the number of pulses as indicated by the ignition dwell data latch 564, an ignition dwell comparator 566 identifies the two values as being equal and sends a signal to the ignition control switch 558 thereby turning off the ignition coil 520, which causes the field in the ignition coil 520 to collapse generating the high voltage which arcs across the spark plug 27. The process can be repeated with various values written into the ignition dwell data latch 564 which will alter the dwell and therefore the intensity of the spark. The above described control of the ignition is referred to as joint control because the timing is generated from the engine control module 14 while the dwell time is generated by the engine management system 10 through user commands.

Alternatively, independent control may be accomplished by having the ignition control logic circuit 514 generate the ignition timing independently.

Independent control requires a position reference signal which is not dependent on the engine control module 14. A preferred system employs the shaft encoder 368 which produces shaft encoder pulses 572 as it rotates as well as other position monitoring sensors as described above in the independent injector timing control description. These pulses 572 can be counted and the position or timing of the ignition can be inferred from the counting of the pulses 572. For example, if the coil dwell is to begin after 30 degrees of engine rotation and if the shaft encoder 368 produces a pulse every 1 degree, then 30 pulses would need to be counted before coil charging begins. The shaft encoder pulses 572 are sent to the ignition counter 550 which counts these pulses 572 and the ignition comparator 556 compares the value from the ignition counter 550 to the value in the ignition data latch 552. The CPU 300 has written the desired value, which represents the number of encoder pulses 572 that must pass before charge up begins, into the ignition data latch 552 via the CPU bus 306 and the ignition decoder 554. When the comparator 556 detects the two values as being equal, it sends a signal to the ignition control switch 558, which activates the ignition driver 516 which produces an alternate ignition control signal, turning on the ignition coil 520 (charge up). The ignition comparator 556 also sends a signal to the ignition dwell counter 560 to begin counting pulses from the ignition oscillator 562. The ignition dwell data latch 564 is set to a user defined value by the CPU 300 via the CPU bus 306 and the ignition decoder 554. The user defined value represents the dwell time before the spark is fired. Time is measured by counting the number of pulses generated by the ignition oscillator 562. The ignition dwell counter 560 counts these pulses and since the time between the pulses is constant, the desired time can be measured by counting a certain number of pulses. The certain number is contained in the ignition dwell data latch 564. When the ignition dwell counter 560 has counted the number of pulses as indicated by the ignition dwell data latch 564, the ignition dwell comparator 566 sends a signal to the ignition control switch 558 thereby turning off the coil charge up. This causes the spark plug 27 to discharge which causes ignition of the air/fuel mixture in the cylinder. This process represents independent control of the ignition system 26 since the engine control module 14 is not utilized.

When the engine control module 14 is configured to receive an ignition validation signal from sensors in the engine 12 confirming the firing of the spark plug 27, the engine management system 10 will need to provide the ignition validation signal to prevent the engine control module 14 from sensing the loss of control of the ignition system 26 as a malfunction. The reference ignition signal 508 is monitored by the CPU 300 and when it is determined that ignition should occur (usually the rising or falling edge of the signal) the CPU 300 issues commands and data to a D/A converter 580 through the CPU bus 306. The instructions and commands cause the D/A converter 580 to generate a simulated ignition validation signal which is sent to the engine control module 14 through an ignition validation relay 582. The ignition validation signal can be a simple pulse or a more complex shape. The shape of the ignition validation signal depends on the type of sensor and ignition system used. The shape is programmable by the CPU 300 therefore any shape can be digitally stored and recalled depending on the preference of the user and engine. The generation of a simulated ignition validation signal will always happen regardless of the control mode of the ignition system. It is currently preferred to use a mechanical relay for the ignition validation relay, but because mechanical relays are slow to respond in relation to the speed at which the ignition validation signals arrive, the ignition validation relay 582 is only switched over to an actual ignition validation sensor in the engine 12 during a circuit failure or power failure. As discussed above, in the case of the ignition relay 518 this assures that a system fault will not damage the engine 12.

Figure 9:
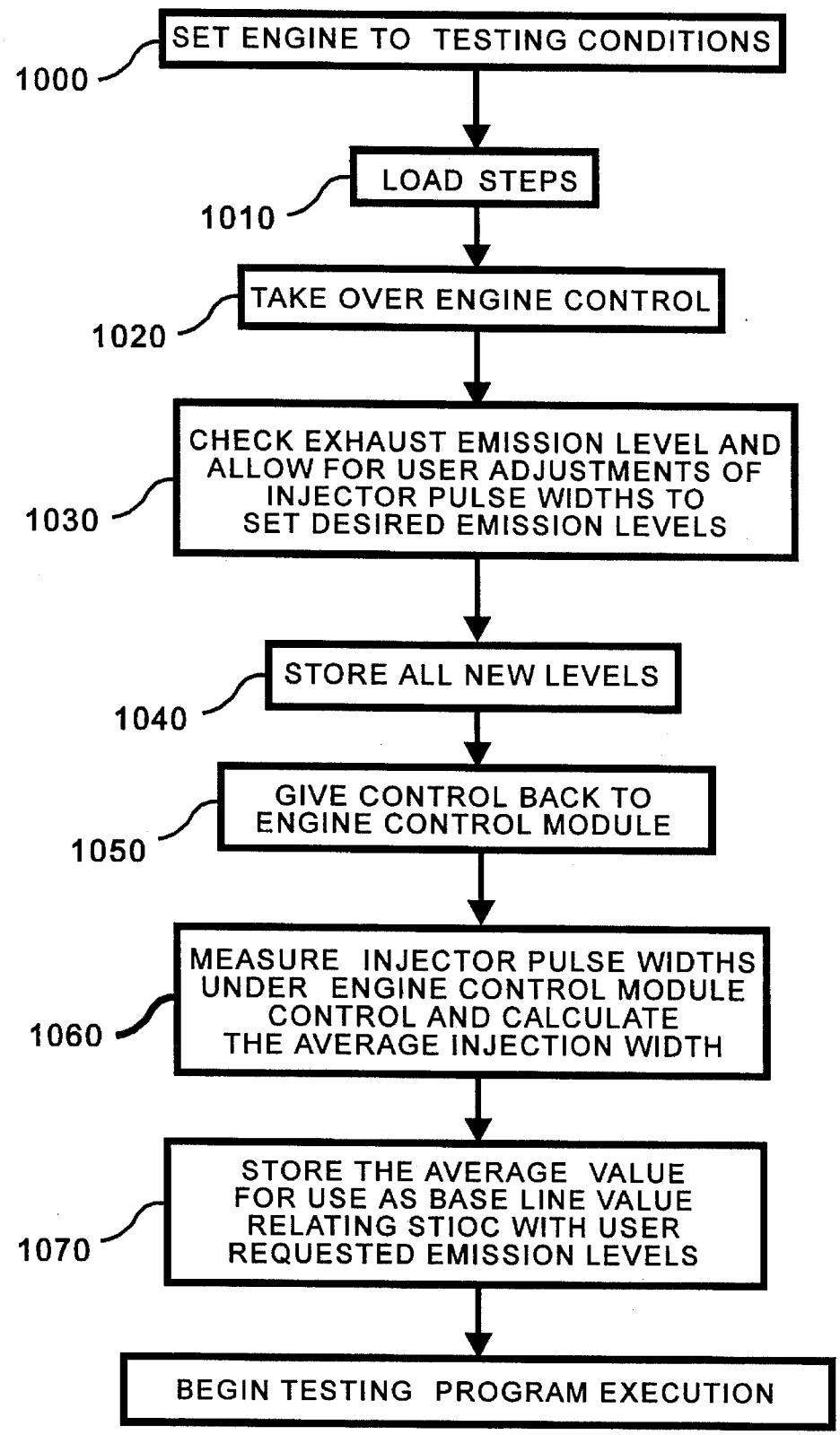
FIG. 9 is a flow diagram for the method of the present invention, illustrating the steps associated with initiating a computer for conducting the test, where the engine is stabilized under control of the engine control module.

FIG. 9 illustrates the steps for establishing conditions under which the test will be conducted. Step 1000 starts the engine and sets the speed and the load under which the test will be run.

In step 1010, the CPU is loaded by the operator with the commands under which the engine management system will be run. This can be done through a conventional input device such as a keyboard or a disk drive. The commands will consist of a series of timed instructions establishing injector pulse width control, injector timing, changing spark timing, coil dwell and when the engine control module is to receive an exhaust gas signal or a simulated exhaust gas signal.

After steps 1000 and 1010 have been executed, step 1020 is initiated. During this step, the engine is controlled by the engine management system. The operator steps through each operator defined instruction and holds each instruction for a time sufficient to stabilize the response of the engine. In step 1030 the emission levels are checked using emission analyzers and calibration is made by correcting the injector pulse width value for that particular instruction. The operator then moves on to the next instruction and repeats the procedure until all injector pulse width values are calibrated.

Step 1040 assigns these injector pulse width values as base reference injector pulse widths and stores them in memory registers of the CPU reserved for the base reference injector pulse widths.

Step 1050 runs the engine under control of the engine control module. While the engine is running under control of the engine control module, the average injector pulse width is calculated in step 1060. Step 1070 stores the average calculated injector pulse width in the CPU memory.

Figure 10:
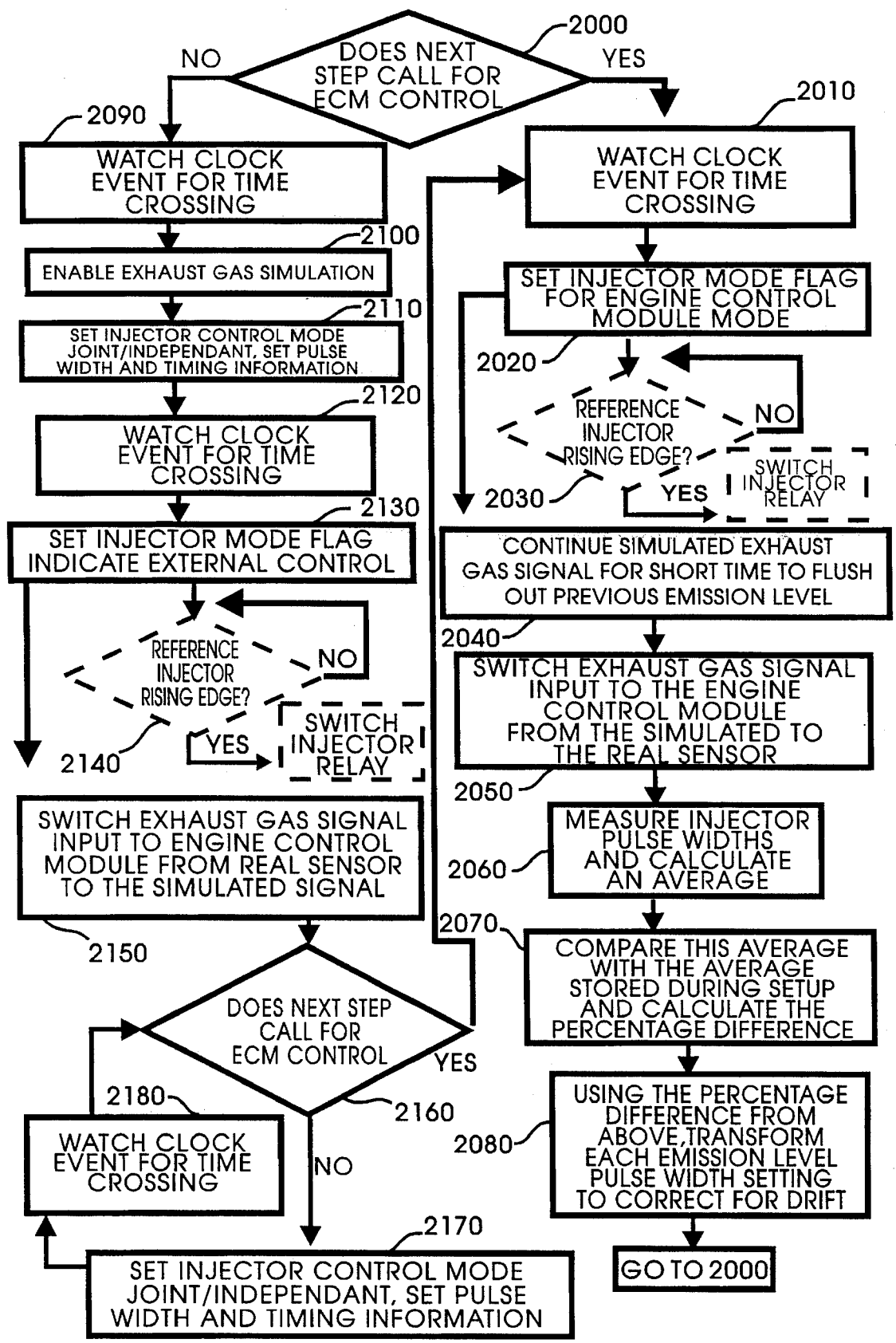
FIG. 10 is a flow diagram showing typical testing steps for the method of the present invention for controlling the fuel injection system when being implemented with an engine management system having a central processing unit.

When the preparatory steps set forth in FIG. 9 have been completed, the engine control is turned over to the engine management system and the engine is controlled by the engine management system as outlined in FIG. 10.

The operator commands, loaded into the CPU in step 1010 of FIG. 9, are sequentially presented to an engine control routine in step 2000 of FIG. 10 which checks to establish whether the next step calls for the engine control module to control the fuel injection system. If the engine control module is to take control, the series of steps on the right side of FIG. 10 is executed. In step 2010, the CPU of the engine management system waits for the current timed instruction to complete. An injector flag is set in step 2020 indicating that the engine control module control is requested. This injector flag can be global for all injectors, but each of the injectors must maintain its current control mode until the injector relay logic circuit detects the condition of step 2030 has been satisfied. As the condition in step 2030 is satisfied for an injector the injector relay is switched.

In step 2040 the CPU waits while the engine control module continues to receive the simulated exhaust gas signal before it is switched to the actual signal generated by the exhaust gas sensor. The CPU wait is sufficient to flush out previous exhaust gasses resulting from running under the engine management system.

Step 2050 switches the signal received by the engine control module from the simulated exhaust gas signal to the actual exhaust gas signal.

Step 2060 calculates the average pulse width while the injectors are under the control of the engine control module. This value will determine if the environmental conditions have varied since the last time the engine was controlled by the engine control module. Step 2070 compares the value calculated in 2060 with the previous value saved in step 1080 of FIG. 9 and calculates the percentage difference.

Step 2080 provides corrected or compensated values for the base reference injector pulse widths stored in the CPU in step 1040 of FIG. 9. These corrected values are obtained by multiplying the percentage difference calculated in step 2070 with each of the base reference injector pulse widths stored in the CPU in step 1040 of FIG. 9. (These values are then saved by the CPU.)

When step 2080 is completed, step 2000 is repeated. If the next command does not call for control by the engine control module, the CPU waits a predetermined amount of time before the end of the current timed instruction at step 2090.

Step 2100 begins the generation of the simulated exhaust gas signal by enabling the simulation routine.

Step 2110 assigns the injector pulse widths equal to the values saved in step 2080.

In step 2120 the CPU waits for the current timed instruction to complete.

Step 2130 sets an injector mode flag indicating engine management system control is requested. The injector flag can be global of all injectors, but each of the injectors must maintain its current control mode until the injector relay control logic circuit detects the condition of 2140 has been satisfied. As the condition of step 2140 is satisfied for an injector the corresponding injector relay is switched.

Step 2150 switches the signal received by the engine control module from the actual exhaust gas signal to the simulated exhaust gas signal.

Step 2160 checks the next command for the engine management system and, if the command calls for the engine control module, it transfers to step 2010. If not, in step 2170, new injector pulse widths are set to the appropriate values saved in step 2080.

At Step 2180, The CPU waits for the current timed instruction to complete. After completion of step 2180, the process is returned to step 2160.

Figure 11:
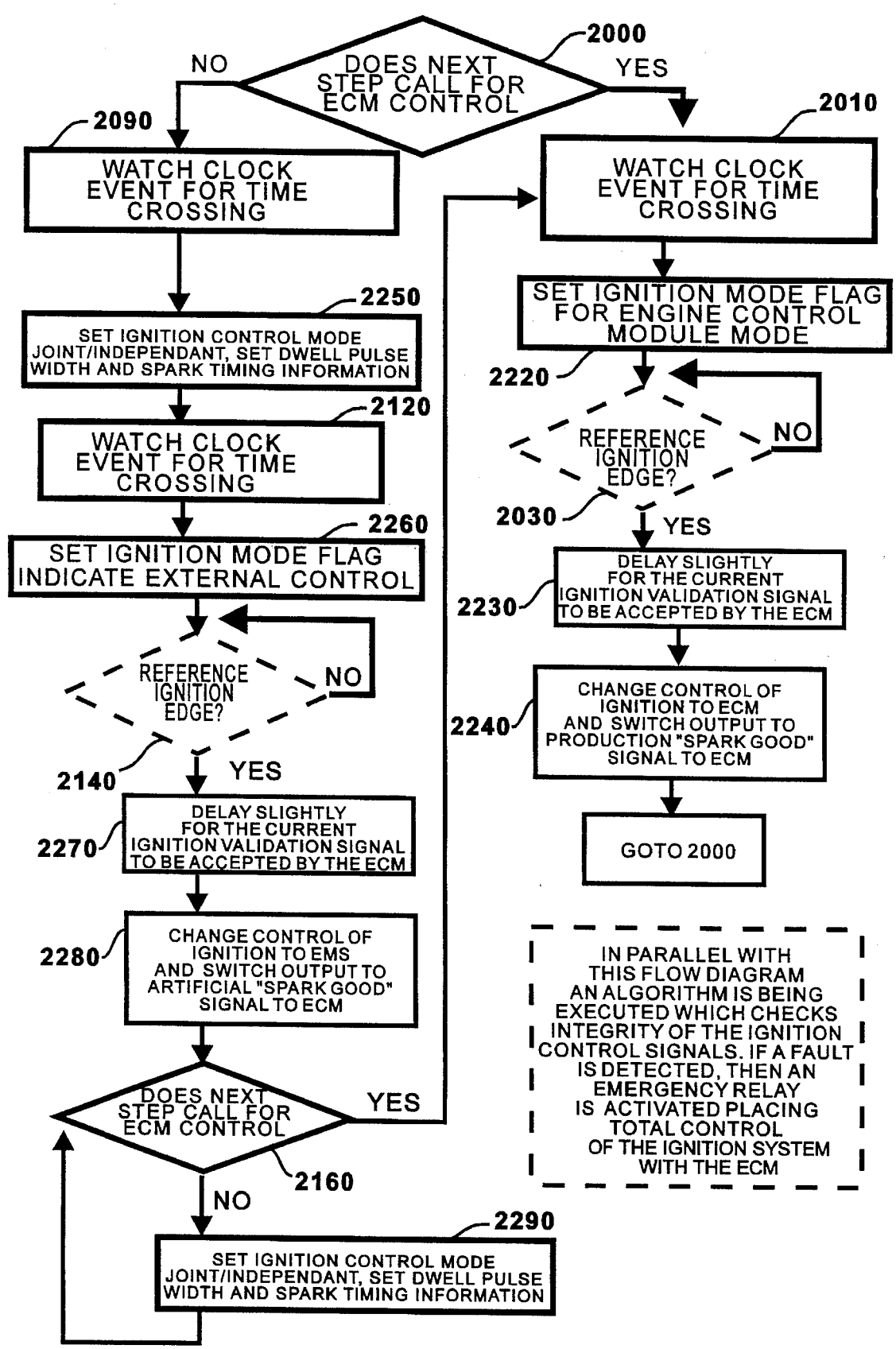
FIG. 11 is a flow diagram showing typical testing steps for the method of the present invention for controlling the electronic ignition system when being implemented with an engine management system having a central processing unit.

While, as described above, the method would leave the control of the ignition system with the engine management system at all times, FIG. 11 shows a block diagram outlining the method for controlling the electronic ignition system including a method for smoothly transferring control between the engine control module and the engine management system. This method closely parallels the method for controlling the fuel injection system in FIG. 10. Starting at step 2000, as in FIG. 10, the operator commands, loaded into the CPU in step 1010 of FIG. 9, are sequentially presented to an engine control routine in step 2000 of FIGS. 10 and 11 which checks to establish whether the next step calls for the engine control module to control the fuel injection system and the electronic ignition system. If the engine control module is to take control, the series of steps on the right side of FIG. 11 are executed.

In step 2010, the CPU of the engine management system waits for the current timed instruction to complete. An ignition flag is set in step 2220 indicating that the engine control module control is requested. The ignition system maintains its current mode until the ignition relay logic circuit detects the condition of step 2030 has been satisfied. As the condition in step 2030 is satisfied the ignition relay control logic circuit delays in step 2230 until the engine control module receives the next simulated ignition validation signal. After this delay, in step 2240 the ignition relay is switched transferring control of the ignition system to the engine control module and the production of the ignition validation signal to the ignition sensors in the engine.

When step 2240 is completed, step 2000 is repeated. If the next command does not call for control by the engine control module, the CPU waits a predetermined amount of time before the end of the current timed instruction at step 2090.

Step 2250 assigns the ignition dwell times and the ignition timing and sets the mode of control as joint or independent.

In step 2120 the CPU waits for the current timed instruction to complete.

Step 2260 sets an ignition mode flag indicating engine management system control is requested. The ignition system must maintain its current control mode until the ignition relay control logic circuit detects the condition of 2140 has been satisfied. As the condition of step 2140 is satisfied, the method delays the change of signal at step 2270 until the current ignition validation signal from the engine is accepted by the engine control module. In step 2280 the ignition relay and the ignition validation signal relay are switched to accept signals from the engine management system.

Step 2160 checks the next command for the engine management system and, if the command calls for engine control module, it transfers to step 2010. If not, in step 2290, new ignition dwell times and ignition timing are set.

The method of the present invention is well suited to aid in performing many engine and sensor tests. For example, this method could be used to age a catalytic converter artificially by exposing it to various emission patterns and temperature profiles. This can best be accomplished be varying an engine's fuel injection and ignition systems. Since this test may take some time and must be reproducible from month to month and day to day, a means for compensating for atmospheric changes as well as other factors must be taken into account. The method described above allows the user to continuously alter control of the engine's fuel injection and ignition systems while automatically compensating for other factors, such as temperature and barometric pressure, which will alter engine performance.

While the invention has been described in terms of preferred embodiments, special configurations, and particular methods, it should be appreciated of one skilled in the art that variation in the methods and the equipment can be made by one skilled in the art without departing from the spirit of the invention.

What I claim is:

1. An engine management system for testing an engine having an electronic fuel injection system having fuel injectors for injecting fuel into the engine which, in an engine control mode, is regulated by an engine control module which generates an injector control signal and is responsive to exhaust gas signals generated by exhaust gas sensors comprising:

means for generating at least one set of user defined injector pulse widths for providing a user defined fuel supply to the engine;

means for generating a reference injector signal which is computer compatible, said reference injector signal being generated from the injector control signal generated by the engine control module;

means for generating an alternate injector control signal for a user control mode;

means for transforming said reference injector signal to a simulated exhaust gas signal for presentation to the engine control module during said user control mode;

means for transferring between said alternate injector control signal of said user control mode and the injector control signal of the engine control mode; and means for transferring between said simulated exhaust gas signal of said user control mode and the exhaust gas signal from the exhaust gas sensors.

2. The engine management system of claim 1 wherein said means for transferring between said alternate injector control signal of said user control mode and the injector control signal of the engine control mode further comprises:

at least one injector relay for switching the fuel injectors between said user control mode and the engine control mode;

means for setting an injector flag for each injector relay, said injector flag defining the state to which said at least one injector relay is to be set, these states being said user control mode or the engine control mode;

a signal conditioner for processing the injector control signal which outputs said reference injector signal; and an injector relay control logic circuit responsive to said injector flag and said reference injector signal which toggles all of said at least one injector relay when, said injector flag is set and a rising edge of said reference injector signal is sensed.

3. The engine management system of claim 2 wherein said means for transferring between said simulated exhaust gas signal of said user control mode and the exhaust gas signal from the exhaust gas sensors further comprises:

at least one exhaust gas relay connected to said simulated exhaust gas signals and to the exhaust gas signal and the engine control module;

means for setting an exhaust flag;

means responsive to said exhaust flag for initiating toggling said at least one gas relay; and means for delaying transferring from said simulated exhaust gas signals to the exhaust gas signals of between about 250 and 500 milliseconds from toggling said at least one relay.

4. The engine management system of claim 3 wherein said means for generating an alternate injector control signal is an inductive circuit and further comprising:

means for initiating said alternate injector control signal.

5. The engine management system of claim 4 wherein said means for initiating said alternate injector control signal further comprises:

a crankshaft position sensor;

an engine cycle sensor; and an injector control logic circuit responsive to said crankshaft position sensor and said engine cycle sensor, said injector control logic circuit generating said alternate injector control signal.

6. The engine management system of claim 4 wherein said means for initiating said alternate injector control signal further comprises:

a reference injector signal.

7. The engine management system of claim 3 wherein the engine has an electronic ignition system which, in the engine control mode, is regulated by the engine control module which generates ignition control signals, the engine management system further comprising:

means for generating at least one set of user defined ignition coil dwells for providing a user defined dwell setting;

means for generating a reference ignition signal which is computer compatible, said reference ignition signal being generated from the ignition control signal generated by the engine control module; and means for generating an alternate ignition control signal for said user control mode.

8. The engine management system of claim 7 wherein the engine control module generates ignition control signals and expects an ignition validation signal confirming spark plug ignition, the engine management system further comprising:

means for generating a simulated ignition validation signal triggered by said reference ignition signal.

9. The engine management system of claim 8 wherein said means for generating said alternate ignition control signal further comprising:

means for initiating said alternate ignition control signal.

10. The engine management system of claim 9 wherein said means for initiating said alternate ignition control signal further comprises:

a crankshaft position sensor;

an engine cycle sensor; and an ignition control logic circuit responsive to said crankshaft position sensor and said engine cycle sensor, said ignition control logic circuit generating said alternate ignition control signal.

11. The engine management system of claim 10 wherein said engine cycle sensor further comprises:

a camshaft position sensor.

12. The engine management system of claim 10 wherein said means for initiating said alternate ignition control signal further comprises:

a reference ignition signal.

13. A method for managing an engine during testing, the engine being fitted with electronic fuel injectors, an engine control module, an exhaust system, at least one exhaust gas sensor for providing exhaust gas signals to at least one exhaust gas signal input of the engine control module, the method comprising the steps of:

stabilizing the engine at a user defined load and speed;

running the engine under its engine control module for a time sufficient to establish a base line operation;

calculating a base average pulse width of the injector control signal generated by the engine control module for establishing the base line operation;

transferring the operation of the injectors of the engine from the engine control module to user defined pulse widths; and providing a simulated exhaust gas oxygen signal to the engine control module while operating under said user defined pulse widths to substitute for the exhaust gas signal from the at least one exhaust gas sensor.

14. The method of claim 13 wherein said transferring the operation of the injectors of the engine from the engine control module to user defined pulse widths further comprises the steps of:

monitoring to observe the closing of the injectors; and delaying said transferring the operation of the injectors until each of the injectors is observed closing.

15. The method of claim 14 further comprising the steps of:

periodically returning for a timed interval the operation of the injectors to the engine control module and presentation to the engine control module of the exhaust gas signals from the at least one exhaust gas sensor;

calculating a new pulse width average for said timed interval; and comparing said new pulse width average with said base average pulse width and scaling said user defined pulse width with respect to the difference in said base average pulse width and said new pulse width average.

16. The method of claim 14 further comprising the step of:

providing user defined initiation of said user defined pulse widths.

\* \* \* \* \*